United States Patent
Khosla et al.

(10) Patent No.: US 12,353,444 B1
(45) Date of Patent: Jul. 8, 2025

(54) SYSTEMS AND METHODS FOR MACHINE LEARNING TO ASSESS AND INCREASE USER ENGAGEMENT FROM USER INPUTS

(71) Applicant: CK12 Foundation, Menlo Park, CA (US)

(72) Inventors: Neeru Khosla, Portola Valley, CA (US); Nimish Pachapurkar, Fremont, CA (US); Miral Shah, San Jose, CA (US)

(73) Assignee: CK12 Foundation, Menlo Park, CA (US)

( * ) Notice: Subject to any disclaimer, the term of this patent is extended or adjusted under 35 U.S.C. 154(b) by 0 days.

(21) Appl. No.: 18/887,313

(22) Filed: Sep. 17, 2024

Related U.S. Application Data

(60) Provisional application No. 63/583,482, filed on Sep. 18, 2023.

(51) Int. Cl.
    *G06F 7/00*     (2006.01)
    *G06F 16/28*     (2019.01)
    *G06N 20/00*     (2019.01)

(52) U.S. Cl.
    CPC ........... *G06F 16/287* (2019.01); *G06N 20/00* (2019.01)

(58) Field of Classification Search
    CPC .............................. G06F 16/287; G06N 20/00
    USPC .................................................. 707/600–899
    See application file for complete search history.

(56) References Cited

U.S. PATENT DOCUMENTS

| | | | |
|---|---|---|---|
| 11,898,865 B1 * | 2/2024 | Bhavsar | B60W 50/14 |
| 11,966,702 B1 | 4/2024 | Wilkinson et al. | |
| 2007/0136273 A1 | 6/2007 | Rehberg et al. | |
| 2018/0218268 A1 | 8/2018 | Kozloski et al. | |
| 2019/0197415 A1 | 6/2019 | Bulut et al. | |
| 2019/0294694 A1 | 9/2019 | Dash et al. | |
| 2021/0264520 A1 | 8/2021 | Cummings | |
| 2023/0185820 A1 | 6/2023 | Benoit | |
| 2023/0244934 A1 | 8/2023 | Lazaridou et al. | |

OTHER PUBLICATIONS

Abu-Salih et al. "A systematic literature review of knowledge graph construction and application in education." Heliyon. Feb. 1, 2024, 10(3): e25383, 23 pages.

(Continued)

*Primary Examiner* — Isaac M Woo
(74) *Attorney, Agent, or Firm* — COOLEY LLP

(57) ABSTRACT

A method including receiving at least one input, detecting at least one parameter associated with a context, generating, by a machine learning model, a first set of data classes enriched with the context, determining if each data class is associated with a data class repository to define a subset of data classes not associated with a data class repository, and generating, by a machine learning model, at least one data class repository for each data class. The method includes generating a display signal to display information associated with at least one data class repository, the display signal associated with a graphical user interface, altering, using a machine learning model, the display signal by altering at least one portion of the graphical user interface associated with the context, and sending the display signal to display the at least one portion of the graphical user interface on the user device.

20 Claims, 17 Drawing Sheets

(56) References Cited

OTHER PUBLICATIONS

Akhtar et al. "Detecting fake news and disinformation using artificial intelligence and machine learning to avoid supply chain disruptions." Annals of Operations Research. Aug. 2023;327(2):633-57.

Alhothali et al. "Predicting Student Outcomes in Online Courses Using Machine Learning Techniques: A review." Sustainability. May 19, 2022;14(10):6199, 23 pages.

Alruwais et al. "Evaluating Student Knowledge Assessment Using Machine Learning Techniques." Sustainability. 2023; 15(7):6229, 25 pages.

Author Unknown. "College Tools. Leveraging AI for Effective University Exam Preparation: A Report." [online blog]. Retrieved from the Internet on Aug. 15, 2024. URL: https://www.collegetools.io/blog/leveraging-ai-for-effective-university-exam-preparation:-a-report, 6 pages.

Ayouni et al. "A new ML-based approach to enhance student engagement in online environment." Plos one. Nov. 10, 2021;16(11):e0258788, 16 pages.

Benedetto, Luca "Tackling Misinformation with Machine Learning." SWForum.eu [online forum]. Retrieved from the Internet on Aug. 15, 2024. URL: https://swforum.eu/online-sw-forum/software-technology/6/tackling-misinformation-machine-learning. 25 pages.

Chance et al. "Using AI to Help Students Prepare for the SAT Creating college entrance exam prep materials can take a lot of time, but artificial intelligence tools make the process easier." Edutopia. org. Nov. 9, 2023. Retrieved from the Internet. URL: https://www.edutopia.org/article/using-ai-sat-prep-lessons/, 11 pages.

Choi et al. "Towards an Appropriate Query, Key, and Value Computation for Knowledge Tracing." L@S '20: Proceedings of the Seventh ACM Conference on Learning @ Scale, Aug. 12-14, 2020, Virtual Event, USA, arXiv:2002.07033v5, URL: https://arxiv.org/pdf/2002.07033v5, 9 pages.

Christopher, James "How to Raise Your Test Scores with Help of AI Simulations." [online blog]. Retrieved from the Internet on Aug. 15, 2024. URL: https://jameschris.medium.com/how-to-raise-your-test-scores-with-help-of-ai-simulation-8ef210e9a46f, 12 pages.

Cooper, Colin "How AI and Machine Learning Are Revolutionising Customer Engagement." [online blog] Jun. 27, 2023. Retrieved from the Internet. URL: https://medium.com/@colin-cooper/how-ai-and-machine-learning-are-revolutionising-customer-engagement-6552ea6ad146, 10 pages.

Co-pending U.S. Appl. No. 18/740,464, inventors Khosla; Neeru et al., filed Jun. 11, 2024.

Co-pending U.S. Appl. No. 18/827,005, inventors Khosla; Vinod et al., filed Sep. 6, 2024.

Ettorre et al. "A Knowledge Graph Enhanced Learner Model to Predict Outcomes to Questions in the Medical Field." HAL Open Science, EKAW 2020—22nd International Conference on Knowledge Engineering and Knowledge Management, Sep. 2020, Bolzano, Italy, https://inria.hal.science/hal-02915414, 16 pages.

Gimpel et al. "Unlocking the power of generative AI models and systems such as GPT-4 and ChatGPT for higher education: A guide for students and lecturers." Hohenheim Discussion Papers in Business, Economics and Social Sciences No. 02-2023; 2023, 57 pages.

Kannan et al. "Graph Neural Networks for Predicting Student Performance: A Deep Learning Approach for Academic Success Forecasting." International Journal of Intelligent Systems and Applications in Engineering (IJISAE). 2024, 12(1s), pp. 228-232.

Kong et al. "Validating a Computational Thinking Concepts Test for Primary Education Using Item Response Theory: An Analysis of Students' Responses." Computers & Education. Oct. 1, 2022;187:104562, 18 pages.

Kumar et al. "Identification and Addressal of Knowledge Gaps in Students." In 2022 3rd International Conference for Emerging Technology (INCET) May 27, 2022, 6 pages.

Liu et al. "Improving Knowledge Tracing via Pre-training Question Embeddings," arXiv:2012.05031v1, URL: https://arxiv.org/pdf/2012.05031, Dec. 9, 2020, 7 pages.

Matthews, Ed. "How Can AI Tools Improve Student Assessment Outcomes?" Open Assessment Technologies, TAO. 2023. [online]. Retrieved from the Internet. URL: https://www.taotesting.com/blog/how-can-ai-tools-improve-student-assessment-outcomes/, 9 pages.

Persaud, "Bloom's Taxonomy: The Ultimate Guide [Free Download], Gain a deep understanding of Bloom's taxonomy and how it can be effectively applied in the learning process to benefit both educators and learners." Top Hat Blog. May 15, 2024, retrieved on Jun. 21, 2024 at https://tophat.com/blog/blooms-taxonomy/, 11 pages.

Ruiz, Armand "AI for Personalized Learning System for Students." [online blog]. Jun. 3, 2023. Retrieved from the Internet. URL: https://www.nocode.ai/personalized-learning-system-for-students/, 10 pages.

Ruiz-Rojas et al. "Empowering Education with Generative Artificial Intelligence Tools: Approach with an Instructional Design Matrix." Sustainability. Jul. 25, 2023;15(15):11524, 20 pages.

Schmucker et al. "Assessing the Performance of Online Students—New Data, New Approaches, Improved Accuracy." arXiv preprint arXiv: 2109.01753. Sep. 4, 2021, 44 pages.

Sekeroglu et al. "Systematic Literature Review on Machine Learning and Student Performance Prediction: Critical Gaps and Possible Remedies." Applied Sciences. Nov. 18, 2021;11(22):10907, 23 pages.

Toti et al. "Detection of Student Engagement in e-Learning Systems Based on Semantic Analysis and Machine Learning." In Advances on P2P, Parallel, Grid, Cloud and Internet Computing: Proceedings of the 15th International Conference on P2P, Parallel, Grid, Cloud and Internet Computing (3PGCIC-2020) 15 2021, 13 pages (pp. 211-223).

Wang, M. "Characteristics of Item Response Time for Standardized Achievement Assessments." [Doctoral dissertation] University of Iowa, 2017, 244 pages.

Wu et al. "SGKT: Session graph-based knowledge tracing for student performance prediction." Expert Systems with Applications. Nov. 15, 2022; 206:117681, 12 pages.

* cited by examiner

500

```
Receive at least one goal from a user
505
```
↓
```
Generate, using a first machine learning model, a set of concept
candidates based on the at least one goal, at least one concept
database, and feedback from the user
510
```
↓
```
Revise the set of concept candidates based on an input from a
reviewing user
515
```
↓
```
Determine if each concept from the set of concept candidates is
associated with learning content to define a subset of concept
candidates
520
```
↓
```
Generate, using a second machine learning model, learning content
for each concept from the subset of concept candidates
525
```
↓
```
Revise the learning content for each concept from the set of concept
candidates based on input from the reviewing user
530
```
↓
```
Calculate a set of unlearned concepts from the set of concept
candidates that are not associated with a set of learned concepts of
the user
535
```
↓
```
Display, to the user on a user device, learning content associated
with at least one concept from the set of concept candidates
540
```

SYSTEMS AND METHODS FOR MACHINE LEARNING TO ASSESS AND INCREASE USER ENGAGEMENT FROM USER INPUTS

CROSS REFERENCE TO RELATED APPLICATIONS

This application claims priority to and the benefit of U.S. Provisional Application No. 63/583,482, filed Sep. 18, 2023, entitled "Systems and Methods for Machine Learning to Assess and Increase User Engagement from User Inputs", the disclosure of which is hereby incorporated by reference in its entirety.

BACKGROUND

The embodiments described herein relate to systems and methods for machine learning (e.g., neural network based models, large language models, etc.) to assess and increase a user engagement from user inputs.

Machine learning models can be used conversationally to provide outputs based on an input from a user. However, some known machine learning models are unable to assess if the inputs indicate additional information about the user or changes in user behavior.

The outputs from the machine learning models may be based on the machine learning model being trained from a set of training data. However, often the training data does not include information related to the behavior of the user and/or changes in user behavior. This lack of information may decrease a user's engagement or interest in the outputs from the machine learning model. This can be especially detrimental in an educational or other learning setting.

Accordingly, a need exists for a machine learning model(s) that can assess and customize user experience from user inputs to guide a user to a desirable result.

SUMMARY

In some embodiments, a method includes receiving, by a compute device, at least one input from at least one of a user device of a user or at least one database. The method further includes detecting, by the compute device, at least one parameter from the at least one input, the at least one parameter associated with a context. The method further includes generating, by a first machine learning model and based on the at least one parameter, a first set of data classes, the first set of data classes enriched with the context. The method further includes determining, by the compute device, if each data class from the first set of data classes is associated with a data class repository to define a subset of data classes, the subset of data classes including data classes that are not associated with a data class repository. The method further includes generating, by a second machine learning model, at least one data class repository for each data class from the subset of data classes. The method further includes generating a display signal to display, on the user device, information associated with at least one data class repository associated with the first set of data classes, the display signal associated with a graphical user interface. The method further includes altering, using a third machine learning model based on the context, the display signal, wherein altering the display signal includes altering at least one portion of the graphical user interface associated with the context. The method further includes sending the display signal to display the at least one portion of the graphical user interface on the user device.

In some embodiments, the method includes receiving, by a compute device, at least one input from at least one of a user device of a user or at least one database. The method further includes detecting, by the compute device, at least one parameter from the at least one input, the at least one parameter associated with a context. The method includes classifying, by a classifier based on historical user data, current user information associated with the user. The method includes determining, based on the classified current user information, at least one desired parameter from the at least one parameter. The method includes generating, by at least one machine learning model based on the at least one desired parameter, at least one content repository, the at least one content repository enriched with the context. The method includes generating, using a reinforcement learning model, a random set of content enrichment data. The method includes selecting, using a reinforcement learning model based on a user parameter, at least one content enrichment from a data set of content enrichment data, the reinforcement learning model trained based on content enrichment and the at least one desired parameter. The method includes enriching the at least one content repository with the at least one content enrichment. The method includes sending a signal to display, on the user device, information associated with the at least one content repository.

In some embodiments, a non-transitory processor-readable medium stores code representing instructions to be executed by one or more processors. The instructions include code to cause the one or more processors to receive, a plurality of inputs associated with interaction data of a user. The instructions include code to cause the one or more processor to generate, using at least one machine learning model based on at least the plurality of inputs, a set of data. The instructions include code to cause the one or more processors to determine, using the at least one machine learning model based on the interaction data, at least one parameter. The instructions include code to cause the one or more processors to update, based on the at least one parameter and at least one target parameter, the set of data. The instructions include code to cause the one or more processors to display, on a user device, the set of data. The instructions include code to cause the one or more processors to receive a plurality of responses associated with the user and the set of data. The instructions include code to cause the one or more processors to generate, using at least one machine learning model based on the plurality of responses, at least one updated parameter. The instructions include code to cause the one or more processors to train the at least one machine learning model based on a difference between the at least one updated parameter and the target parameter.

BRIEF DESCRIPTION OF THE DRAWINGS

FIG. 5 shows a flowchart for a method for generating content for a user, according to an embodiment.

FIGS. 8-15 show user engagement with a conversation model displayed on a user device, according to example embodiments.

DETAILED DESCRIPTION

Figure 1A:
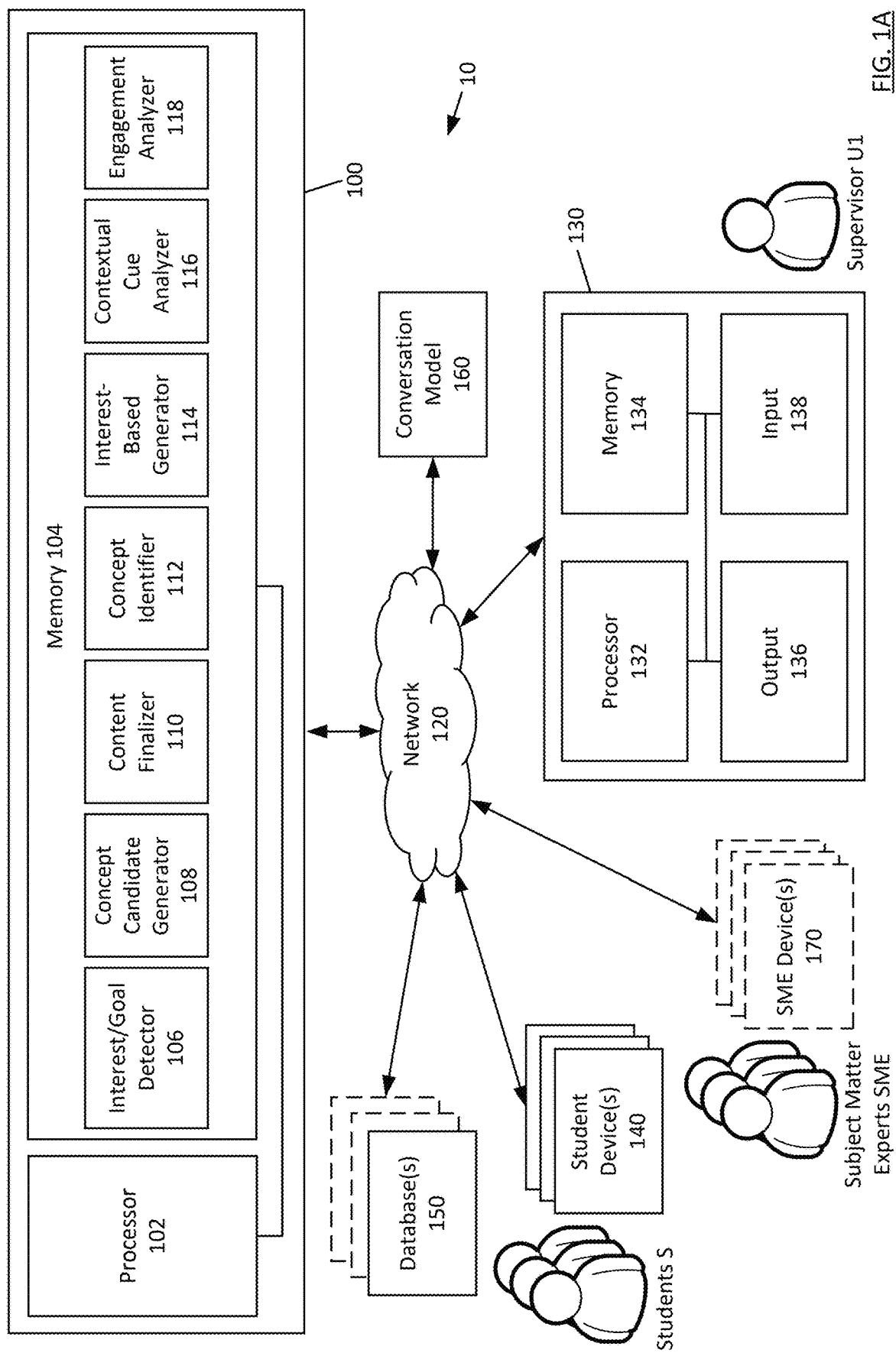
FIG. 1A shows a block diagram for a system for assessing and customizing user experience from user inputs, according to an example embodiment.

In some embodiments, a machine learning model is used to customize a user experience (e.g., learning content, engagement, etc.) of a user. A method includes receiving an input from a user device and/or a database. At least one parameter (e.g., a goal, an interest, etc.) is detected from the input. Based on the parameter, a set of subject matter (e.g., concepts, learning concepts, data classes, etc.) are generated by at least one machine learning model. The set of subject matter is compared to a content repository to identify whether each of the set of subject matter is associated with the content repository. Content repositories (e.g., data class repository) are then generated for the subject matter that are not associated with a content repository.

In some embodiments, a method includes receiving an input from a user device and/or a database. At least one parameter (e.g., a goal, an interest, etc.) is detected from the input. The method then includes classifying current user information associated with the user. Based on the classified current user information, at least one desired parameter is determined. A content repository is then generated based on the at least one desired parameter.

In some embodiments, a method includes receiving an input from a user device and/or a database. At least one parameter (e.g., a goal, an interest, etc.) is detected from the input. A set of actions (e.g., user actions, prompts, content, etc.) is then determined. The set of actions is associated with the at least one parameter. At least one recommended action is then determined based on the set of actions and a user parameter associated with the user.

In some embodiments, a non-transitory processor-readable medium stores code representing instructions to be executed by one or more processors. The instructions include code to cause the one or more processors to receive inputs associated with the behavior of a user. The behavior of the user includes information associated with at least one of user behavior, user interests, or user goals. Learning content (e.g., study materials, questions, answers, videos, etc.) is then generated based on the inputs.

Learning can be achieved using various mediums, including reading books, watching videos, listening to audio, and/or so forth. Traditionally, curricula are standardized so that each student is presented with similar learning content. As discussed herein, with artificial intelligence-based conversation models, students may ask a conversation model for answers. However, the systems and methods described herein are configured to use user inputs with a conversation model to customize the experience of the user when interacting with the user model. The customized experience can increase user interest and/or engagement and make the user's interactions with the conversation model more effective.

While some systems and methods described herein are described in reference to students and education, the system and methods can be applied to any set of user inputs to determine information associated with a user. For example, the systems and methods described herein can be applied to employees and workplaces, a company and a market, and/or the like.

FIG. 1A shows a block diagram of a system 10 for processing data to assess and customize a user experience from user inputs, according to an embodiment. The system 10 includes a user customization system 100, a network 120, a supervisor device 130 (e.g., primary compute device, hub, superior device, first compute device), student devices 140 (e.g., secondary compute device(s), node(s), etc.), database(s) 150, a conversation model 160, and subject matter expert (also known as "SME devices") 170. In some embodiments, the system 10 is associated with an entity (e.g., commercial entity, educational entity, etc.), including and/or associated with supervisor U1 (e.g., managers, teachers, reviewers, etc.) and/or students S.

The network 120 facilitates communication between the components of the system 10. The network 120 can be any suitable communication network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In some instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 120 can be encrypted or unencrypted. In some instances, the network 120 can include multiple networks or subnetworks operatively coupled to one another by, for example, network bridges, routers, switches, gateways and/or the like (not shown).

The supervisor device 130 is configured to generate, view, and/or complete actions by a supervisor U1. The supervisor device 130 includes a processor 132, a memory 134, an output 136, and an input 138, each operatively coupled to one another (e.g., via a system bus) and each in communication with the network 120. In some implementations, the supervisor device 130 is associated with (e.g., owned by, accessible by, operated by, etc.) the supervisor U1. The supervisor U1 can be any type of user, such as, for example, a teacher, a professor, a school, an administrator, a manager, an employee, a customer, an operator, and/or the like. While the system 10 is shown in FIG. 1 as including one supervisor device 130, in some embodiments the system 10 includes multiple supervisor devices, each associated with one or more users and each in communication with the user customization system 100 via the network 120.

The processor 132 of the supervisor device 130 may be a hardware-based integrated circuit (IC) or any other suitable processing device configured to run and/or execute a set of instructions or code. In some implementations, the processor 132 is a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 is operatively coupled to and in communication with the memory 134, the output 136, the input 138, and the network 120, such as through a system bus (e.g., address bus, data bus, control bus, etc.) and/or a wireless connection.

The memory 134 of the supervisor device 130 may be a random-access memory (RAM), a memory buffer, a hard drive (e.g., solid state drive (SSD), hard disk drive (HDD), etc.), a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 includes extendable storage units that can be added and used incrementally. In some implementations, the memory 134 can be a portable memory (e.g., a flash drive, a portable hard disk, and/or the like) that can be operatively coupled to the processor 132. In some embodiments, the memory 134 can be remotely operatively coupled with a compute device separate from (e.g., detached from) the supervisor device 130. For example, a remote database device can serve as a memory and be operatively coupled to the supervisor device 130.

The output 136 is operatively coupled to the processor 132 and is configured to present (e.g., display, provide, etc.) information to supervisor U1. For example, in response to the user customization system 100 generating a future student skill prediction, processor 132 can receive the future student skill prediction and the output 136 can present the future student skill prediction to the supervisor U1. In some implementations, the output 136 is a display, such as a Cathode Ray tube (CRT) display, Liquid Crystal Display (LCD), Light Emitting Diode (LED) display, Organic Light Emitting Diode (OLED) display, and/or other displays configured to present information visually. In some implementations, the output 136 is a speaker or other audio output device configured to present information to the supervisor U1, such as recommended actions, aurally. In some implementations, the output 136 is configured to provide feedback to the supervisor U1 via haptic feedback.

The input 138 is operably coupled to the processor 132 and is configured to provide a signal to the processor 132 to complete a task. In some implementations, the input 138 is a peripheral device, such as, for example, a mouse, keyboard, global positioning system (GPS), microphone, touch screen, speaker, scanner, headset, camera, and/or the like. In some instances, the supervisor U1 can use the input 138 to send information to the user customization system 100 via the network 120, such as career information or a location of the supervisor device 130. In some instances, the input 138 is configured to provide a request for information (e.g., query) to the user customization system 100 via the network, such as a request for user engagement information.

In some implementations, each of the student device(s) 140 can be substantially similar to the supervisor device 130. The student device(s) 140 can include a processor similar to the processor 132, a memory similar to the memory 134, an output device similar to the output 136, and an input device similar to the input 138. The student device(s) 140 are configured to send and receive information from the user customization system 100 via the network 120. The information provided to the user customization system 100 by the student device(s) 140 may include device data (e.g., battery health, network connectivity speed, geographic location, etc.), student engagement data (e.g., screentime, keylogger information, login and logout times, shutdown and start up times, etc.), and other raw data input to the student device(s) 140. The information can also include answers to questions generated by the conversation model 160 and/or additional information associated with the student S's interactions with the conversation model 160.

The database(s) 150 store information related to the system 10 and the processes described herein. For example, the database(s) 150 can store organizational strategy information, change logs, change triggers, digital calendars, communications, activity reports, direct engagement information, digital artifacts (e.g., email messages, calendar appointments, documents, text messages, reports, etc.), conversation data, assessment data, assignment data, user and/or student profiles, data on content explored by users and/or students and/or similar information. The database(s) 150 can be any device or service configured to store signals, information, and/or data (e.g., hard-drive, server, cloud storage service, etc.). The database(s) 150 can receive and store signals, information and/or data from the other components (e.g., the supervisor device 130, the student device(s) 140, the conversation model 160, the user customization system 100, etc.) of the system 10. The database(s) 150 can include a local storage system associated with the user customization system 100, such as a server, a hard-drive, or the like or a cloud-based storage system. In some implementations, the database(s) 150 can include a combination of local storage systems and cloud-based storage systems. In some implementations, the database(s) 150 include different databases for storing different information. For example, the database(s) 150 can include a database for storing information associated with and used to determine a goal, interest, and/or engagement of a user. For example, the database(s) 150 can include information received from the student device(s) 140, the database(s) 150, the supervisor device 130, and/or the SME device(s) 170. In some implementations, the database(s) 150 can include at least one of student S selected interests, student S questions and answers, an interest database, a knowledge state associated with at least one student S, an internal content repository, an external content repository, implicit cues from student S interactions, optimization policies (e.g., engagement goals, etc.), and/or the like. In some implementations, the database(s) 150 can include learning content repositories. The content repositories include and/or store content associated with a plurality of concepts. The plurality of concepts can include subject matter associated with different education subjects such as math concepts, physics concepts, history concepts, etc. For example, the content repositories can include quizzes, textbooks, videos, reading materials, and/or the like associated with a plurality of concepts.

The system 10 further includes a conversational artificial intelligence (AI) model, shown as a conversation model 160. The conversation model 160 can receive inputs from and provide outputs to one or more users and/or students S (e.g., via supervisor device 130 and/or student device(s) 140). The conversation model 160 can be used as a chatbot by the students S to aid in their learning of particular topics. The conversation model 160 can record and save chat information (e.g., from conversations with the student) in the database(s) 150. In some implementations, the conversation model 160 includes a large language model, and/or the like to generate outputs based on the inputs from the one or more users or students S.

In some implementations, the conversation model 160 can provide prompts to one or more users or students to obtain information (e.g., user information, student information, interest information) and can use the one or more inputs to extract user interests, train a model (e.g., the concept candidate generator 108, the content finalizer 110, the interest-based generator 114, the contextual cue analyzer 116, the engagement analyzer 118, etc.) or as input to a model. In some implementations, the conversation model 160 stores students'S inputs and associated outputs in the database(s) 150. The conversation model 160 can be configured to receive inputs from the user customization system 100 and to display prompts to the students S (e.g., via student device(s)) based on the inputs. For example, the conversation model 160 can receive prompts associated with user interests and/or user goals. In some implementations, the conversation model 160 can receive information associated with recommended actions for at least one of the students S.

In some implementations, the SME device(s) 170 can be substantially similar to the supervisor device 130. The SME device(s) 170 can include a processor similar to the processor 132, a memory similar to the memory 134, an output device similar to the output 136, and an input device similar to the input 138. The SME device(s) 170 are configured to send and receive information from the user customization system 100 via the network 120. The information provided to the user customization system 100 by the SME device(s) 170 may be feedback and/or review information from a subject matter expert SME associated with the SME device(s) 170. The subject matter expert SME can be a subject matter expert in education, a particular educational field, a certain subject, and/or the like. In some implementations, the SME device(s) 170 are optional. In some implementations, the system 10 includes more than one SME device 170 associated with one or more subject matter expert SME.

The user customization system 100 is configured to receive a plurality of inputs (e.g., from the conversation model 160, from the database(s) 150, from the student device(s) 140, from the supervisor device 130, from the SME device(s) 170, etc.) and to customize a user (e.g., student S) experience and determine user engagement from the plurality of inputs. The user customization system 100 includes a processor 102 and a memory 104, each operatively coupled to one another (e.g., via a system bus). The memory 104 may store and/or include an interest/goal detector 106, a concept candidate generator 108, a content finalizer 110, a concept identifier 112, an interest-based generator 114, a contextual cue analyzer 116, and an engagement analyzer 118. In some implementations, the supervisor device 130 is associated with (e.g., owned by, accessible by, operated by, etc.) an organization, and the user customization system 100 is associated with (e.g., owned by, accessible by, operated by, etc.) the same organization. In some implementations, the supervisor device 130 is associated with (e.g., owned by, accessible by, operated by, etc.) a first organization, and the user customization system 100 is associated with (e.g., owned by, accessible by, operated by, etc.) a second organization, different than a first organization. In some implementations, the user customization system 100 and the supervisor device 130 may be components of the same computing system.

The processor 102 of the user customization system 100 can be, for example, a hardware based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 can be operatively coupled to the memory 104 through a system bus (e.g., address bus, data bus, and/or control bus).

The memory 104 of the of the user customization system 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some implementations, the memory 104 can include extendable storage units that can be added and used incrementally. In some implementations, the memory 104 can be a portable memory (e.g., a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

The user customization system 100 can receive inputs from the database(s) 150, the student device(s) 140, the supervisor device 130, and/or the conversation model 160 and customize a user experience based on the inputs. The inputs can be associated with the behavior and/or knowledge of the students S. The inputs can be associated with goals associated with the user. For example, the goals can include a career path, a college major, a college minor, and/or the like. For example, if a student S indicates a career goal of becoming a dentist, certain concepts and/or subject matter in science and math may be associated with the goal. As another example, if the student S indicates a career goal of becoming a criminal lawyer, a different set of science and math concepts and/or subject matter may be associated. The inputs can be associated with interests associated with the user. For example, the inputs can include a list of interests from an interest database (e.g., database 150), user selected interests, user questions and feedback, user feedback, and/or the like. For example, the inputs can include indications that the student S is interested in soccer, video games, fashion, etc. In some implementations, the user customization system 100 may be configured to detect user interests based on the inputs.

In some implementations, the user customization system 100 is configured to detect user engagement and customize user experience based on contextual cues associated with the user. The contextual cues can include user conversations with the conversation model 160, user uploaded quizzes and assignments, user stated interests, a knowledge state associated with the user, implicit cues from user interactions, optimization policies (e.g., engagement goals, etc.), and/or the like. In some implementations, the user customization system 100 is configured to send one or more outputs to the student device(s) 140, the SME device(s) 170, the supervisor device 130, and/or the conversation model 160. For example, the user customization system 100 can send engagement actions (e.g., questions, quizzes, break suggestions, memory enhancement exercises) to at least one of the student device(s) 140 or the conversation model 160. The user customization system 100 can send outputs associated with learning content to the conversation model. The user customization system 100 can send outputs to the SME device(s) 170 that include generated learning content for review by a subject matter expert (SME).

The interest/goal detector 106 receives the inputs and based on the inputs, detects at least one parameter associated with the user. In some implementations, the at least one parameter includes at least one interest and/or at least one goal associated with the user. In some implementations, the interests and/or goals are explicitly stated in the inputs and the interest/goal detector 106 can be configured to associate the interests and/or goals with an associated student S. In some implementations, the interest/goal detector 106 detects the interests and/or goals based on the behavior of the students S. For example, if a student S repeatedly asks questions to the conversation model 160 related to sports, the interest/goal detector 106 can detect that the student S is interested in sports.

In some implementations, the interest/goal detector 106 includes a machine learning model. In some implementations, the machine learning model is a language model (e.g., natural language processing (NLP) model, large language model, etc.). The machine learning model can be configured to parse the inputs and determine frequencies of potential interests. If a potential interest has a frequency above a predetermined threshold, the interest/goal detector 106 may determine that the potential interest is an interest of the student S. In some implementations, the interest/goal detector 106 may send the determined interests and/or goals to the student S via the student device 140. The student S may confirm or reject the interests.

Figure 1B:
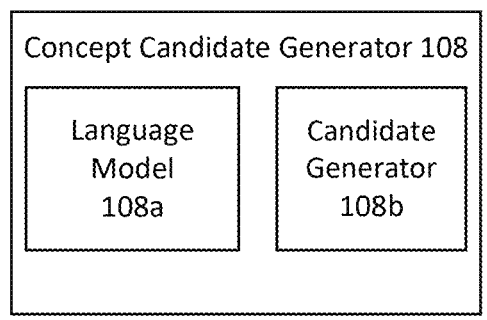
FIGS. 1B-1E show block diagrams of various portions of the memory of FIG. 1A.

The concept candidate generator 108 is configured to generate candidate concepts and/or subject matter based on the at least one parameter (e.g., goal) of the user, external content repositories, internal content repository, and/or the like. The concept candidates (or subject matter candidates) can include learning concepts that are desirable for the user to understand to achieve the goal associated with the user. As seen in FIG. 1B, the concept candidate generator 108 includes a language model 108a and a candidate generator 108b. The language model 108a is configured to receive the information from the content repositories and generate concept lists (or subject matter lists). In some implementations, the language model 108a is a large language model. For example, the language model 108a can generate concept lists based on the location of the user, the culture of the user, the user language, and/or the like. In some implementations, the language model 108a can use a concept map associated with an entity to generate a concept list. In some implementations, the language model 108a can use information from a user's profile such as grade level, enrolled or taken courses, geography, and/or the like, to further personalize and/or generate the concept list. The candidate generator 108b receives the concept list and the goal associated with the user. The candidate generator 108b generates a list of candidate concepts based on the concept list and the goal. In some implementations, the candidate generator 108b receives user feedback on the candidate list. For example, if the concept candidate list includes a concept and/or subject matter that is not relevant to the user, the user can remove the concept and/or subject matter from the concept candidate list (or subject matter list). As another example, the user can supplement the goal and the concept list with concepts and/or subject matter in which the user is interested and/or has already learned. In some implementations, the language model 108a can generate concept lists based on at least one input.

In some implementations, the concept candidate list is sent to the SME device(s) 170 for review by a subject matter expert SME. The subject matter expert SME can confirm or deny concepts on the concept candidate list based on their expertise of whether a certain concept candidate is relevant (e.g., may help in achieving goal) to the goal of the user.

The content finalizer 110 is configured to generate content (e.g., learning content, subject matter) based on the concept candidate list. The content is associated with each of the concepts in the concept candidate list. For example, the content can include quizzes and lessons related to concepts in the concept candidate list. For example, the content can include calculus exercises if one of the concept candidates is calculus. The content finalizer 110 determines if each concept in the concept candidate list is associated with content in the content repositories (e.g., database(s) 150). In some implementations, the content finalizer 110 determines if there is a desirable (e.g., more than a predetermined threshold) amount of associated content in the content repositories, thus defining a subset of concepts. For each concept from the subset of concepts that either does not have associated content or has an undesirable amount of associated content, the content finalizer is configured to generate additional content.

Figure 1C:
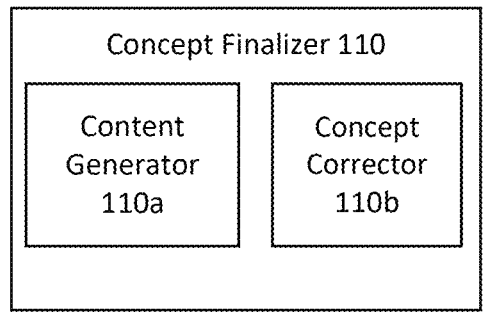

As seen in FIG. 1C, the content finalizer 110 includes a content generator 110a and a concept corrector 110b. The content generator 110a is configured to generate content based on each concept from the subset of concepts. In some implementations, the content generator 110a is a machine learning model. In some implementations, the machine learning model is a language model such as a large language model (LLM).

In some implementations, the concept corrector 110b sends the concepts and associated content to the SME device(s) 170 for review by a subject matter expert SME. The subject matter expert SME can accept, reject, or modify the content based on expertise in the field. After review by the subject matter expert SME, the concept corrector 110b finalizes the concepts and associated content by implementing any changes indicated by the subject matter expert SME. In some implementations the finalized concepts and associated content are saved in at least one database of the database(s) 150 for future use.

The concept identifier 112 identifies a set of key concepts associated with the goals of the user based on the goal of the user from the finalized concepts. In some implementations, the concept identifier 112 can determine if the goal of the user has changed. If the goal has changed, the concept identifier may send an output to the interest/goal detector 106 that the goal has changed. The key concepts can correspond to and/or be associated with the concepts that are desirable to be understood by a user to achieve the goal. The concept identifier 112 then identifies concepts from the key concepts of which the user has not demonstrated sufficient understanding (e.g., unlearned concepts). For example, the concept identifier 112 can identify concepts from the key concepts that are not associated with a set of learned concepts of the user. These concepts, as well as the associated content are then sent to the conversation model 160 to be displayed to the user (e.g., students S on student device(s) 140).

Figure 1D:
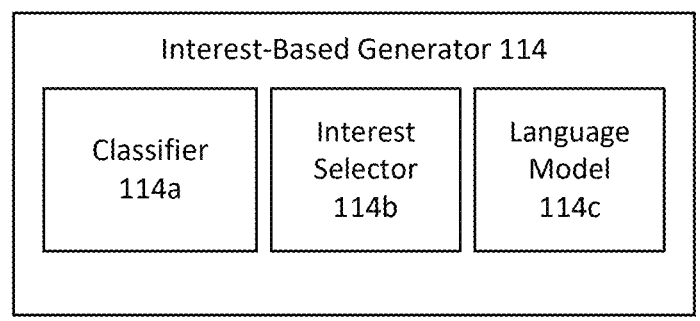

The interest-based generator 114 is configured to generate content (e.g., learning content) based on user interests. The content is customized to the user to increase user interest and engagement with the content. As shown in FIG. 1D, the interest-based generator 114 includes a classifier 114a, an interest selector 114b, and a language model 114c. The classifier 114a is configured to classify the interests detected by the interest/goal detector 106 based on historical data associated with the user. For example, the historical data can include conversation data and context associated with the conversation data. For example, the context can include information that a certain conversation is associated with a certain concept. As another example, the historical data can include a knowledge state associated with the user. The interest selector 114b selects, from the classified interests, interests that are desired for an associated concept. For example, certain interests may be better suited for certain concepts. For example, soccer may be better suited for math concepts than history concepts.

The language model 114c receives the classified interests, the desired interests, and a knowledge state of the user as inputs. Based on these inputs, the language model 114c generates content (e.g., learning content) that is associated with the desired interests and is at or below the knowledge state of the user (e.g., to decrease the likelihood of user confusion) as an output. In some implementations, the language model 114c generates content repositories that include groups of associated content. Similarly stated, a content repository can be and/or include a set of content associated with a subject, topic, concept, etc. The language model 114c can generate the set of content for the content repository. In some implementations, the output includes an interest-specific explanation. For example, the content includes baseball stats used to explain the concept of average values. In some implementations, the output includes interest-specific analogies. For example, the content includes an explanation of the concept of centrifugal force using an analogy of roller coasters. In some implementations, the output includes interest-specific real-world examples. For example, the content can include descriptions of abstract concepts using student S interests to show where such a concept can be applied in the real world. In some implementations, the output can include interest-specific Socratic-style questions. For example, the content can include a series of Socratic-style questions using the student S's interest to help the student S arrive at the final correct answer by building on the previous answers. In some implementations, the output can include interest-specific feedback. For example, the content can include feedback using student S's interest to answers provided by the student S about their correctness and indicates possible mistakes the student may have made. In some implementations, the output can include interest-specific problems that are similar to problems already solved by the student. For example, the content can include generated questions similar to questions asked by the student associated with the interest along with a step-by-step solution and explanation. In some implementations, the output can include interest-specific hints. For example, the content can include hints to the student S associated with the interest if the student is unable to answer a question.

Figure 1E:
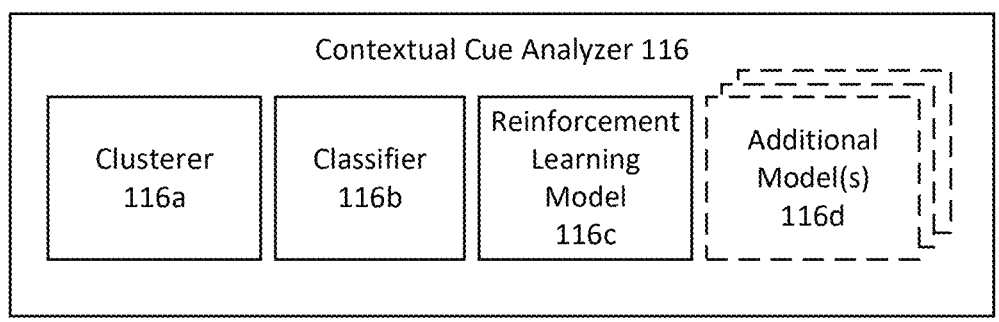

The contextual cue analyzer 116 receives inputs associated with contextual cues associated with the behavior of the user. In some implementations, the contextual cues are associated with the engagement of the user. In some implementations, the inputs can be user conversations with a conversation model, user uploaded quizzes and learning materials, user stated interests, a user knowledge state, implicit cues from user interactions, optimization policies (e.g., engagement goals, etc.), and/or the like. The contextual cue analyzer 116 is configured to organize the contextual cues for processing by the engagement analyzer 118. As seen in FIG. 1E, the contextual cue analyzer 116 includes a clusterer 116a, a classifier 116b, a reinforcement learning model 116c, and, optionally, additional model(s) 116d. The clusterer 116a clusters the inputs based on input type and/or the like. In some implementations, the clusterer 116a is a machine learning model, such as a language model. The classifier 116b is configured to classify the inputs based on the type of concept, topics, subject matter, and/or the like. In some implementations, the classifier 116b is a machine learning model, such as a language model.

The reinforcement learning model 116c is configured to determine actions from the inputs that increase engagement. In some implementations, the reinforcement learning model is a machine learning model such as a reinforcement learning model and/or the like. In some implementations, the additional model(s) 116d may be additional machine learning models or other models configured to further group the inputs, organize the inputs, extract information from the inputs, and/or the like. The reinforcement learning model 116c can be configured to determine the set of actions based on a parameter such as the contextual cues, interests, goals, and/or other parameters associated with the user. In some implementations, the reinforcement learning model 116c is configured to generate a random set of actions (e.g., content enrichment data) and select from the random set of actions based on a user parameter, at least one action. In some implementations, the reinforcement learning model is trained based on a set of actions and at least one user parameter such as interests, goals, contextual cues, and/or the like.

In some implementations, the reinforcement learning model 116c can include at least one of Markov Decision Processes (MDPs), Temporal Difference (TD) Learning, Advantage Actor-Critic (A2C), Asynchronous Advantage Actor-Critic (A3C), Deep Q Networks (DQNs), Deep Deterministic Policy Gradient (DDPG), Evolution Strategies (ES) and/or the like. The reinforcement learning model 116c can incorporate the occurrence of rewards and the associated inputs, outputs, agents, actions, states, and/or state transitions in the scheme of learning. The reinforcement learning model 116c can be configured to implement learning rules or learning algorithms such that upon receiving inputs indicating a desired goal or trajectory that is similar or related to a goal or trajectory that was achieved or attempted to be achieved in the past, the reinforcement learning model 116c can use the history of events including inputs, outputs, agents, actions, state transitions, and/or rewards to devise an efficient strategy based on past knowledge to arrive at the solution more effectively.

In some implementations, a reinforcement learning model 116c can be trained for a goal of a user. The reinforcement learning model can be configured to select one or more goal increasing actions based on which of the actions is likely to help the student achieve the goal the most and which of the actions is likely to increase engagement of the student for the goal the most. This selection can be based on user-specific interests and/or engagement. More specifically, a node in the reinforcement learning model's environment can represent a state of the student (e.g., an agent of the reinforcement learning model) in that student's advancement toward a goal. The reinforcement learning model can then work to maximize a reward (e.g., student achieving the goal, student engagement, etc.) as the student traverses nodes the environment. Similarly stated, the reinforcement learning model can be configured to help the student obtain the goal in the least amount of time/steps possible while working to increase and/or maximize the student's engagement. Next actions for the student S in the reinforcement learning model can be selected based on which next action is most likely increase student S's engagement and knowledge used to achieve the goal. This can be based on data (e.g., question presented, information presented, interactions, etc.), how the data is presented (e.g., transmission type, email, notification, conversation model, etc.), prior knowledge of the student, identified knowledge gaps, interests of the user, etc. Based on the response to that action, the next subsequent action can be taken to maximize the reward (e.g., steps toward achieving the goal) for that student S. Such a reward and the data to train the reinforcement learning model can be specific to the student and/or generalized based on characteristics of the student. As such, the decisions made by the reinforcement learning model can be tailored to that particular student and the goal of that student.

During execution of the reinforcement learning model, hyperparameters can be tuned such that a balance is maintained between exploration and exploitation. Specifically, as an agent (e.g., the student S) traverses the reinforcement learning model, the next step and/or action (e.g., node) can be selected not necessarily based on what appears to be the best next action. Instead, based on a weighting factor, the agent may explore actions other than the likely best action a percentage of the time. For example, for each decision, a weighting factor can be applied based on how likely that decision is the next best action. Based on the weighting factor, that can be chosen as the next action. More specifically, for example, if a first next action has a weighting factor of 50, a second next action has a weighting factor of 25 and a third next action has a weighting factor of 25, the first next action can have a 50% probability of being selected, the second next action can have a 30% probability of being selected and the third next action can have a 20% probability of being selected. The reinforcement learning model can then be further trained based on a result of this exploration. In this manner, the reinforcement learning model can be updated and refined based on exploration and testing different actions. This can also ensure that the reinforcement learning model does not only select the same path at the expense of testing other potential paths.

In some implementations, the reinforcement learning model 116c can implement hierarchical learning (e.g., hierarchical reinforcement learning) using multiple agents undertaking multi-agent tasks to achieve a specified goal. For example, a task can be decomposed into subtasks and assigned to agents and/or sub-agents to be performed in a partially or completely independent and/or coordinated manner. In some implementations, the agents can be part of a hierarchy of agents and coordination skills among agents can be learned using joint actions at higher level(s) of the hierarchy. In this manner, parallel actions can be taken by the reinforcement learning model 116c to increase user engagement and/or likelihood of achieving a goal. For example, multiple subtasks can be identified by different agents in the reinforcement learning model. Each of the multiple tasks can further the goal of the student (e.g., two assignments that can be performed concurrently to achieve a goal of obtaining a certain certificate). Both subtasks can be provided to the student and can be coordinated as the agents traverse the world of the reinforcement learning model 116c.

In some implementations, the reinforcement learning model 116c can implement temporal abstractions in learning and developing strategies to accomplish a task towards a specified goal. Temporal abstractions can be abstract representations or generalizations of behaviors that are used to perform tasks or subtasks through creation and/or definition of action sequences that can be executed in new and/or novel contexts. Temporal abstractions can be implemented using any suitable strategy including an options framework, bottleneck option learning, hierarchies of abstract machines and/or MaxQ methods. Using temporal abstraction, different agents can operate at different levels of the reinforcement learning model 116c to increase user engagement and likelihood of achieving the desired goal. For example, a type and format of question to ask a user can be identified at a first level of the reinforcement learning model 116c. A personalization (e.g., based on student interest) of that question can be done at a second level of the reinforcement learning model 116c. This, the different levels of the reinforcement learning model 116c can have different purposes (e.g., one to identify what should be learned and one to customize the learning to increase user engagement).

While a reinforcement learning model 116c is shown, in some implementations, the model can be omitted and can be implemented as model-free reinforcement learning algorithm to implement agents and their actions.

In some implementations, the reinforcement learning model 116c can be configured to determine a display layout (e.g., graphic user interface layout, etc.) that is configured to increase user engagement and/or the like. For example, the reinforcement learning model 116c can be trained to determine, from a set of possible layouts, which layout can increase user engagement for a particular user. The reinforcement learning model 116c can be configured to alter the layout of the display which can include changing the shape of different features of the display, changing the location on a display screen of different features, changing colors, changing fonts, displaying additional information, changing display theme, and/or the like.

The engagement analyzer 118 receives the outputs from the contextual cue analyzer 116 and determines a set of engagement actions that, when implemented, may increase engagement of the user. In some implementations, the engagement analyzer 118 is a machine learning model (e.g., deep learning model, part of the reinforcement learning model 116c described above, etc.). The engagement analyzer 118 is configured to determine which of the provided information may be associated with an increase in engagement. For example, the engagement analyzer 118 may determine that inputs associated with a student S may indicate that the student S has a tendency to engage with more challenge questions and will likely respond better to questions and conversation that are more intellectually stimulating. The engagement analyzer 118 is configured to determine, based on determining information that increases engagement, a set of actions that may increase user engagement. In some implementations, the set of actions can include user specific content (e.g., based on interests, goals, location, language, culture, etc.), past user experiences, question difficulty, a break recommendation, memory enhancement exercises, suggested topics for conversation, and/or the like. From the set of action, the engagement analyzer 118 may be configured to determine at least one recommended action from the set of actions based on an engagement goal associated with the user. The engagement analyzer 118 may then send the at least one recommended action to the user (e.g., supervisor device 130, student device 140, etc.). As discussed above, in some embodiments, the engagement analyzer 118 can be part of the reinforcement learning model 116c, described herein.

Figure 2:
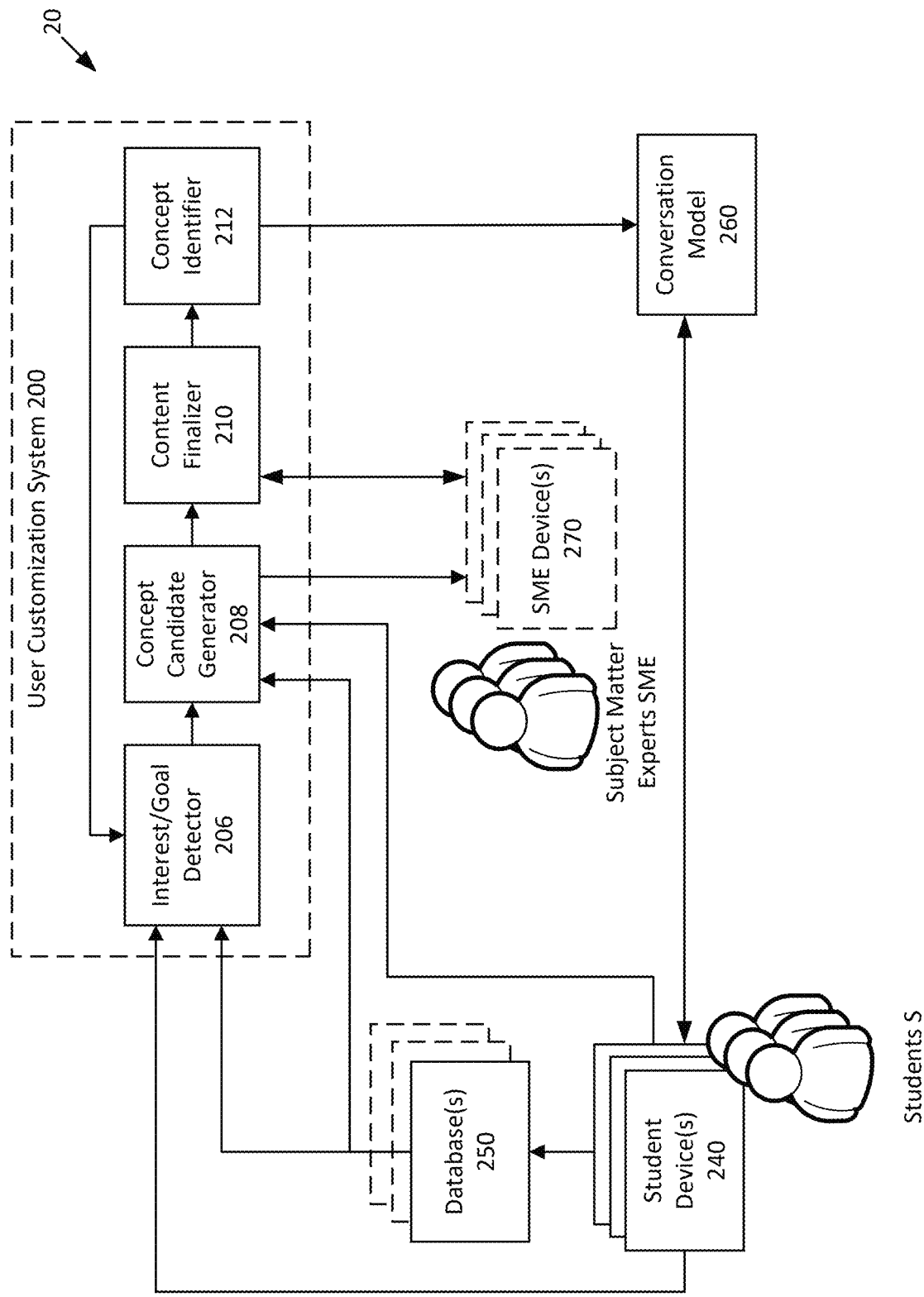
FIG. 2 shows a flowchart of a system for customizing a user experience, according to an example embodiment.

FIG. 2 shows a flowchart of a system 20 for assessing and/or customizing a user experience, according to an example embodiment. The system 20 allows for customizing the user experience based on goals associated with the user. In some implementations, the system 20 is structurally and/or functionally similar to the system 10 of FIG. 1A. The system 20 includes a conversation model 260 (e.g., structurally and/or functionally similar to the conversation model 160 of FIG. 1A), student device(s) 240 (e.g., structurally and/or functionally similar to the student device(s) 140 of FIG. 1A) associated with students S, database(s) 250 (E.g., functionally and/or structurally similar to the database(s) 150 of FIG. 1A), SME device(s) 270 (e.g., functionally and/or structurally similar to the SME device(s) 170 of FIG. 1A) and a user customization system 200 (e.g., structurally and/or functionally similar to the user customization system 100 of FIG. 1A).

The user customization system 200 includes an interest/goal detector 206 (e.g., structurally and/or functionally similar to the interest/goal detector 106 of FIG. 1A), a concept candidate generator 208 (e.g., functionally and/or structurally similar to the concept candidate generator 108 of FIG. 1A and/or FIG. 1B), a content finalizer 210 (e.g., functionally and/or structurally similar to the content finalizer 110 of FIG. 1A and/or FIG. 1C), and a concept identifier 212 (e.g., functionally and/or structurally similar to the concept identifier 112 of FIG. 1A).

The interest/goal detector 206 is configured to receive inputs from at least one of the student device(s) 240 and/or the database(s) 250. The inputs can include information related to a goal of a student S. For example, the information can include a college major, a college minor, a career goal, and/or the like. Additionally, the inputs can include information associated with the goal. For example, the information can include courses associated for a college major and/or college minor, skills associated with a certain career path, certifications associated with a career path and/or the like. The goal detector 206 determines the goal or goals of the associated student S.

The concept candidate generator 208 then receives the goal from the interest/goal detector 206. The concept candidate generator 208 also receives additional information from the database(s) 250, which may include at least one content repository (e.g., learning content repository, external repository, internal repository, etc.). The concept candidate generator 208 can also receive additional information from the student device(s) 240 which may include student S feedback and/or the like. The concept candidate generator 208, based on the inputs, generates a set of concept candidates. The set of concept candidates can include learning content that is associated with the goal or goals of the student S. In some implementations, the set of concept candidates is sent to the SME device(s) 270 for review by a subject matter expert SME who may approve, deny, and/or augment each concept of the set of concept candidates.

The content finalizer 210 receives the set of concept candidates. In some implementations, the content finalizer 210 implements approve, deny, and/or augment decisions as determined by a subject matter expert SME. The content finalizer 210 determines if each concept from the set of concept candidates is associated with a sufficient (e.g., more than a predetermined threshold) amount of content in the at least one content repository. The content finalizer 210 defines a subset of concept candidates that are not associated with a sufficient amount of content. For each concept in the subset of concept candidates, the content finalizer 210 generates content (e.g., learning content) that is associated with the concept. In some implementations, the content finalizer 210 generates a content repository that includes a group of associated content. Similarly stated, a content repository can be and/or include a set of content associated with a subject, topic, concept, etc. The language model 114c can generate the set of content for the content repository. In some implementations, the content is generated using a machine learning model trained (e.g., a large language model (LLM)) to generate content associated with a concept. For example, the content finalizer 210 may generate physics learning materials for a physics concept. In some implementations, the language model 114c generates content based on the user's profile, courses taken, courses enrolled, previous content engagements, interests, geography, and/or the like. In some implementations, the generated content is stored in a database(s) 250. In some implementations, the generated content is sent to an SME device(s) 270 for review by a subject matter expert SME who can approve, deny, and/or augment the generated content.

The concept identifier 212 receives the set of concept candidates and the associated content, including generated content from the content finalizer 210. The concept identifier 212 identifies key concepts from the set of concept candidates that are associated with the goal or goals of the student S. In some implementations, the concept identifier 212 can determine if the goal or goals of the student have changed. If the goal or goals have changed. The concept identifier 212 can send a signal to the interest/goal detector 206, which then updates the goal or goals associated with the student S in the user customization system 200. Based on identifying the key concepts, the concept identifier 212 compares the key concepts to a set of unlearned concepts of the student S. For each key concept that is included in the set of unlearned concepts, the concept identifier 212 sends the concept and associated content to the conversation model 260. The conversation model 260 then can send the associated content to the student device 240 for interaction with the student S. In some implementations, the user customization system 200 can use reinforcement learning (e.g., the reinforcement learning model 116c of FIG. 1F) to determine interests, goals, concepts, and/or the like that are configured to increase a parameter associated with the user. For example, reinforcement learning can be used to determine that certain interest(s) are more likely to increase engagement for certain concepts than other interest(s).

Figure 3:
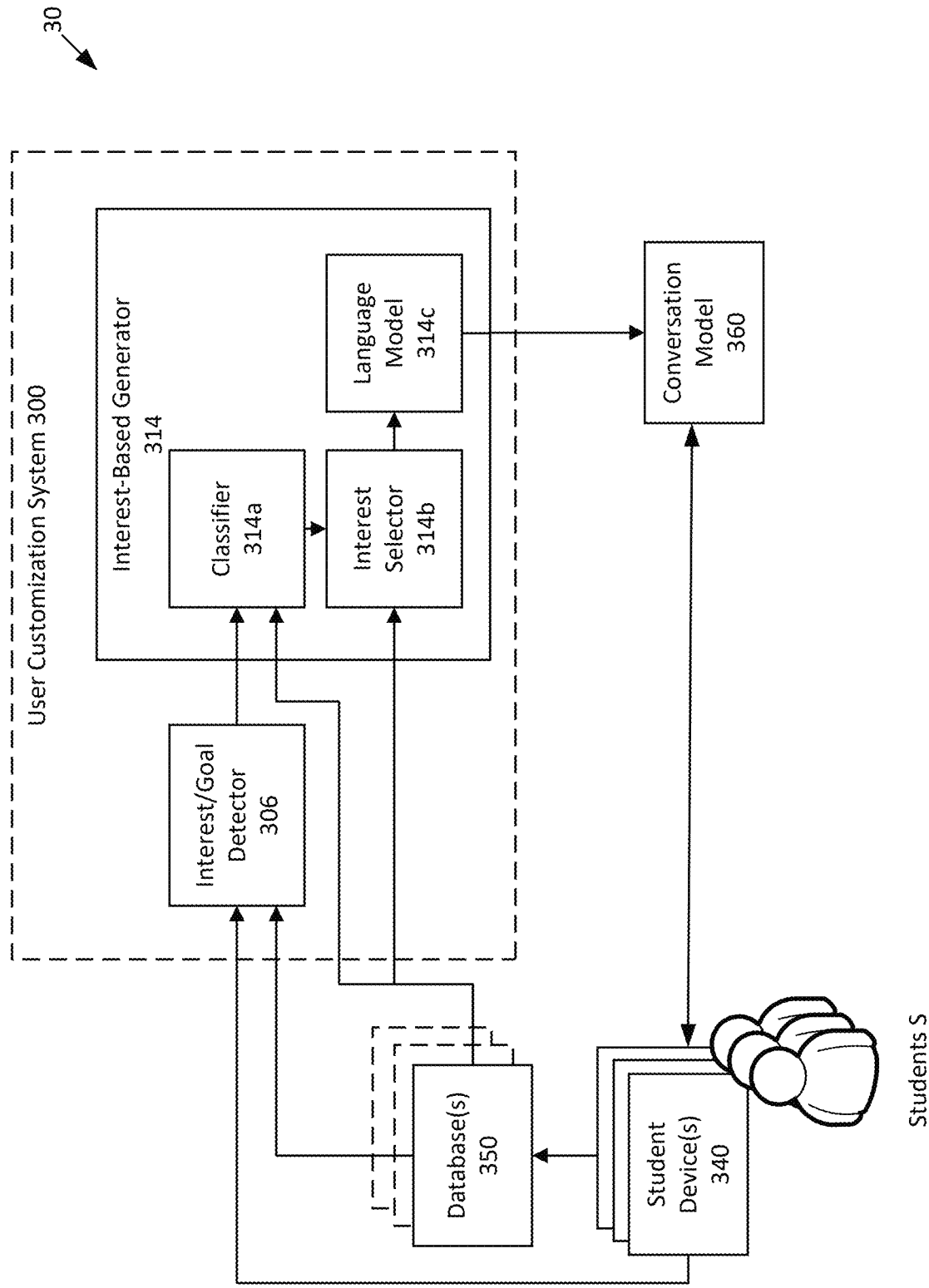
FIG. 3 shows a flowchart of a system for customizing a user experience, according to another example embodiment.

FIG. 3 shows a flowchart of a system 30 for customizing a user experience, according to another example embodiment. In some implementations, the system 30 is structurally and/or functionally similar to the system 10 of FIG. 1A. The system 30 is configured to customize user experience based on interests of the user. The system 30 includes a conversation model 360 (e.g., structurally and/or functionally similar to the conversation model 160 of FIG. 1A), student device(s) 340 (e.g., structurally and/or functionally similar to the student device(s) 140 of FIG. 1A) associated with students S, database(s) 350 (E.g., functionally and/or structurally similar to the database(s) 150 of FIG. 1A), and a user customization system 300 (e.g., structurally and/or functionally similar to the user customization system 100 of FIG. 1A).

The user customization system 300 includes an interest/goal detector 306 (e.g., functionally and/or structurally similar to the interest/goal detector of FIG. 1A) and an interest-based generator 314 (e.g., functionally and/or structurally similar to the interest-based generator 114 of FIG. 1A and/or FIG. 1D). The interest-based generator 314 includes a classifier 314a (e.g., functionally and/or structurally similar to the classifier 114a of FIG. 1D), an interest selector 314b (e.g., functionally and/or structurally similar to the interest selector 114b of FIG. 1D), and a language model 314c (e.g., structurally and/or functionally similar to the language model 114c of FIG. 1D).

The interest/goal detector 306 receives inputs from the database(s) 350 and/or the student device(s) 340. The inputs can include information from an interest database, student S selected interests, student S questions and answers, and/or student feedback on interest-based content. The interest/goal detector 306 determines, based on the inputs, at least one interest associated with the student S. In some implementations, the interest/goal detector 306 determines the interests by classifying student input. For example, the interest/goal detector 306 may determine the interests based on inputs associated with an interest having a frequency that is greater than a predetermined threshold.

The classifier 314a receives the interests from the interest/goal detector 306 and user historical data from the database(s) 350. The classifier 314a classifies the interests detected by the interest/goal detector 106 based on provided historical data associated with the student S. For example, the historical data can include conversation data and context associated with the conversation data. For example, the context can include information that a certain conversation is associated with a certain concept and/or subject matter. As another example, the historical data can include a knowledge state associated with the student S. The interest selector 314b selects a desired interest from the interests determined by the interest/goal detector 306. The desired interest can correspond to and/or be associated with an interest that is more relevant to a concept associated with the student S. For example, soccer may be a more relevant concept to physics concepts than to history concepts.

The language model 314c receives the desired interest, classified inputs, and a knowledge state of the student S to generate content (e.g., learning content) based on the desired interest, classified inputs, and a knowledge state. The output of the language model 314c is configured so that the student S can better learn the content by being interesting in the learning content as well as having the learning content be at or below the student S's knowledge state. In some implementations, the output can include interest-specific explanations, interest-specific questions to check student understanding, interest-specific analogies, interest-specific real-world examples, interest-specific Socratic-style questions, interest-specific feedback, interest-specific hints, and/or the like. The outputs of the language model 314c are sent to the conversation model 360. The conversation model 360 is configured to display the outputs on the student device(s) 340 to the student S. In some implementations, the user customization system 300 can use reinforcement learning (e.g., the reinforcement learning model 116c of FIG. 1F) to determine which output of the language model 314c is desirable based on at least one parameter. For example, reinforcement learning can be used to determine one or more output configured to increase engagement. For example, the reinforcement learning can be used to determine that explanations can be more interesting to a user than questions for certain topics.

Figure 4:
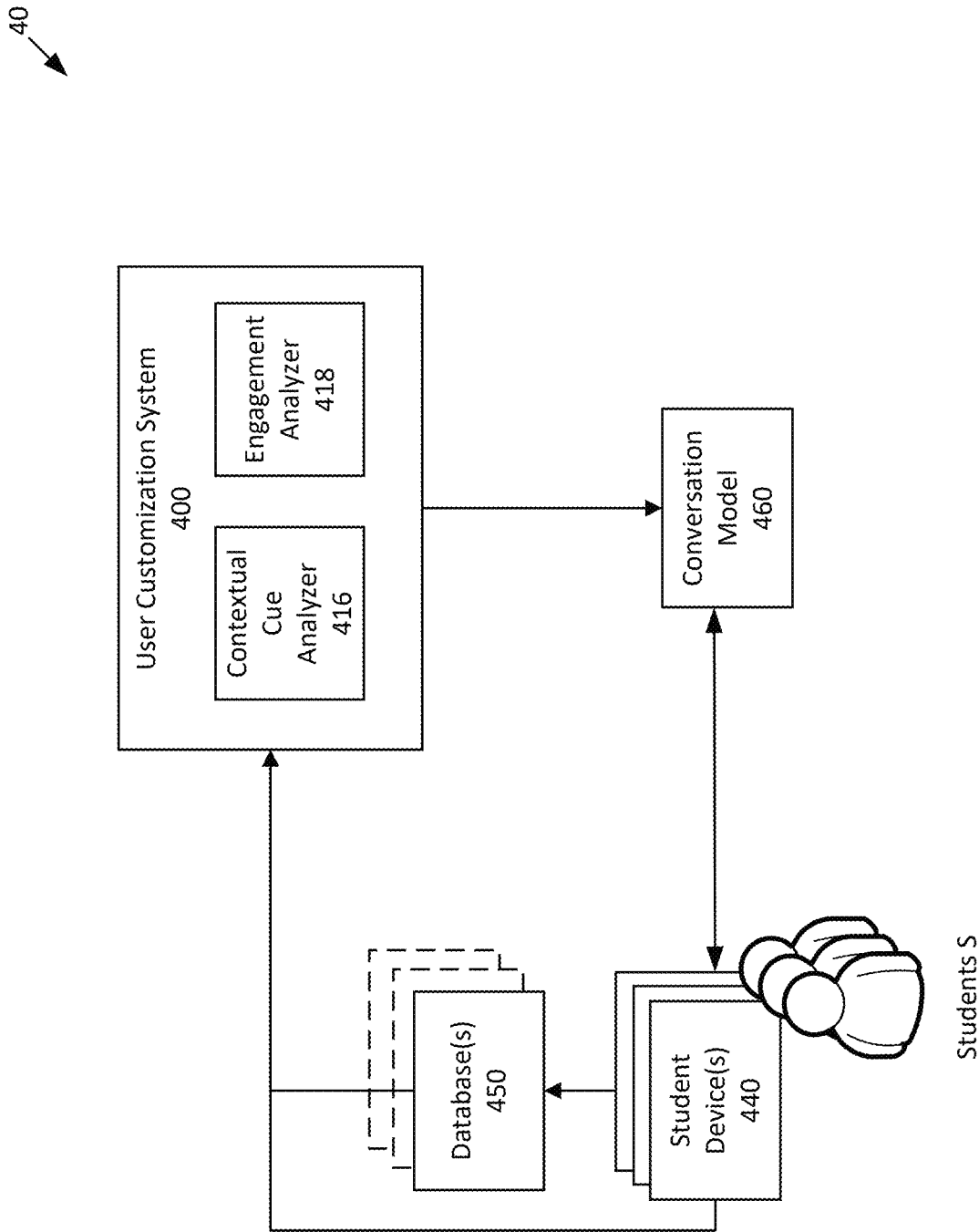
FIG. 4 shows a flowchart of a system for assessing and customizing a user experience, according to another example embodiment.

FIG. 4 shows a flowchart of a system 40 for assessing and customizing a user experience, according to another example embodiment. In some implementations, the system 40 is structurally and/or functionally similar to the system 10 of FIG. 1A. The system 40 is configured to increase student S engagement in learning content. The system 40 includes a conversation model 460 (e.g., structurally and/or functionally similar to the conversation model 160 of FIG. 1A), student device(s) 440 (e.g., structurally and/or functionally similar to the student device(s) 140 of FIG. 1A) associated with students S, database(s) 450 (e.g., functionally and/or structurally similar to the database(s) 150 of FIG. 1A), and a user customization system 400 (e.g., structurally and/or functionally similar to the user customization system 100 of FIG. 1A).

The user customization system 400 includes a contextual cue analyzer 416 (e.g., functionally and/or structurally similar to the contextual clue analyzer 116 of FIG. 1A) and an engagement analyzer 418 (e.g., functionally and/or structurally similar to the engagement analyzer 118 of FIGS. 1A and/or FIG. 1E). The contextual cue analyzer 416 receives inputs from the database(s) 450 and/or the student device(s) 440. The inputs can include contextual cues. For example, the contextual cues can include student S conversation data with the conversation model 460, user uploaded quizzes and learning materials, student S stated interests, the knowledge state of the student S, implicit cues from user interactions, optimization policies (e.g., engagement goals, etc.), and/or the like. The contextual cue analyzer 416 analyzes the inputs using at least one machine learning model. The contextual cue analyzer 416, in some implementations, clusters, classifies, analyzes with a reinforcement learning model, etc. the inputs. Analyzing the inputs can include grouping the inputs into related categories. In some implementations, the contextual cue analyzer 416 determines actions associated with the inputs that may increase student S engagement. The outputs of the contextual cue analyzer 416 are then received by the engagement analyzer 418.

The engagement analyzer 418 can receive the grouped inputs and determine actions to generate a list of actions. The list of actions can be determined to increase engagement of the student S. The engagement analyzer 418 can determine at least one recommended action from the list of action based on an engagement goal of the student S. In some implementations, reinforcement learning can be used to generate the list of actions and/or to determine the at least one recommended action. The at least one recommended action can be determined to likely increase user engagement while aligning with the engagement goal of the student S. The at least one recommended action can be sent to the conversation model 460 for display on the student device(s) 440. In some implementations, the student S can review the at least one recommended action and decide whether to implement or deny.

FIG. 5 shows a flowchart for a method 500 for generating content for a user, according to an embodiment. The method 500 includes receiving at least one goal from a user, at 505; generating, using a first machine learning model, a set of concept candidates based on the at least one goal, at least one concept database, and feedback from the user, at 510; optionally revising the set of concept candidates based on an input from the reviewing user, at 515; determining if each concept from the set of concept candidates is associated with learning content to define a subset of concept candidates, at 520; generating, using a second machine learning model, learning content for each concept from the subset of concept candidates, at 525; optionally revising the learning content for each concept from the set of concept candidates based on inputs from the reviewing user, at 530; optionally calculating a set of unlearned concepts from the set of concept candidates that are not associated with a set of learned concepts of the user, at 535; and displaying, to the user on a user device, learning content associated with at least one concept from the set of concept candidates, at 540. In some implementations, the method 500 can be executed by a system, such as the system 10 of FIG. 1A (e.g., the processor 102 of user customization system 100) and/or the system 20 of FIG. 2 (e.g., the processor of user customization system 200).

At 505, the method 500 includes receiving at least one goal from a user. The goal can correspond to and/or be associated with a career goal, a college major, a college minor, a life goal, and/or the like. In some implementations, the goal may include and/or be associated with associated information. For example, a college major may include courses that are associated with the major or a career goal can include skills and/or certifications associated with the career goal.

At 510, the method 500 includes generating, using a first machine learning model, a set of concept candidates based on the at least one goal, the at least one concept database, and feedback from the user. In some implementations, the first machine learning model is a language model. The at least one concept database can include an internal and/or external concept database that is associated with an organization such as a school, a university, and/or the like. The feedback from the user can include user feedback associated with content in which the user is interested, content in which the user is not interested, and/or the like. The set of concept candidates includes concepts that are associated with the at least one goal of the user.

At 515, the method 500 optionally includes revising the set of concept candidates based on an input from a reviewing user. In some implementations, the reviewing user can be a subject matter expert. The input from the reviewing user can include approving, denying, and/or augmenting a subset of concepts of the set of concept candidates. In some implementations, the at least one machine learning model may be further trained based on the input from the reviewing user.

At 520, the method 500 includes determining if each concept from the set of concept candidates is associated with learning content to define a subset of concept candidates. Determining if each concept is associated with learning content can include determining if associated learning content is stored in a content repository. In some implementations, 520 can include if the amount of learning content associated with a candidate exceeds a predefined threshold. For concepts that have associated learning content, but not enough to exceed the predefined threshold, the concept can be included in the subset of concept candidates.

At 525, the method 500 includes generating, using a second machine learning model, learning content for each concept from the subset of concept candidates. In some implementations, the second machine learning model is a language model. In some implementations, the learning content generated for the subset of concept candidates can be stored in a database for future use. At 530, the method 500 optionally includes revising the learning content for each concept from the set of concept candidates based on input from the reviewing user. In some implementations, the reviewing user can be a subject matter expert. In some implementations, the reviewing user is the same or a different reviewing user than the reviewing user in 515. The inputs from the reviewing user can include approving, denying, and/or augmenting the generated learning content. In some implementations, the reviewing user can determine that it is desirable for additional learning content to be generated. In some implementations, the second learning model may be further trained based on the inputs from the reviewing user.

At 535, the method 500 optionally includes calculating a set of unlearned concepts from the set of concept candidates that are not associated with a set of learned concepts of the user. The set of learned concepts of the user can be stored in a database. At 540, the method 500 includes displaying on a user device, learning content associated with at least one concept from the set of concept candidates. In some implementations, only the learning content associated with the set of unlearned concepts is displayed on the user device. The user can access the learning content to learn the associated concept. In some implementations, after the user has consumed the learning content, the associated concept can be added to the set of learned concepts of the user.

Figure 6:
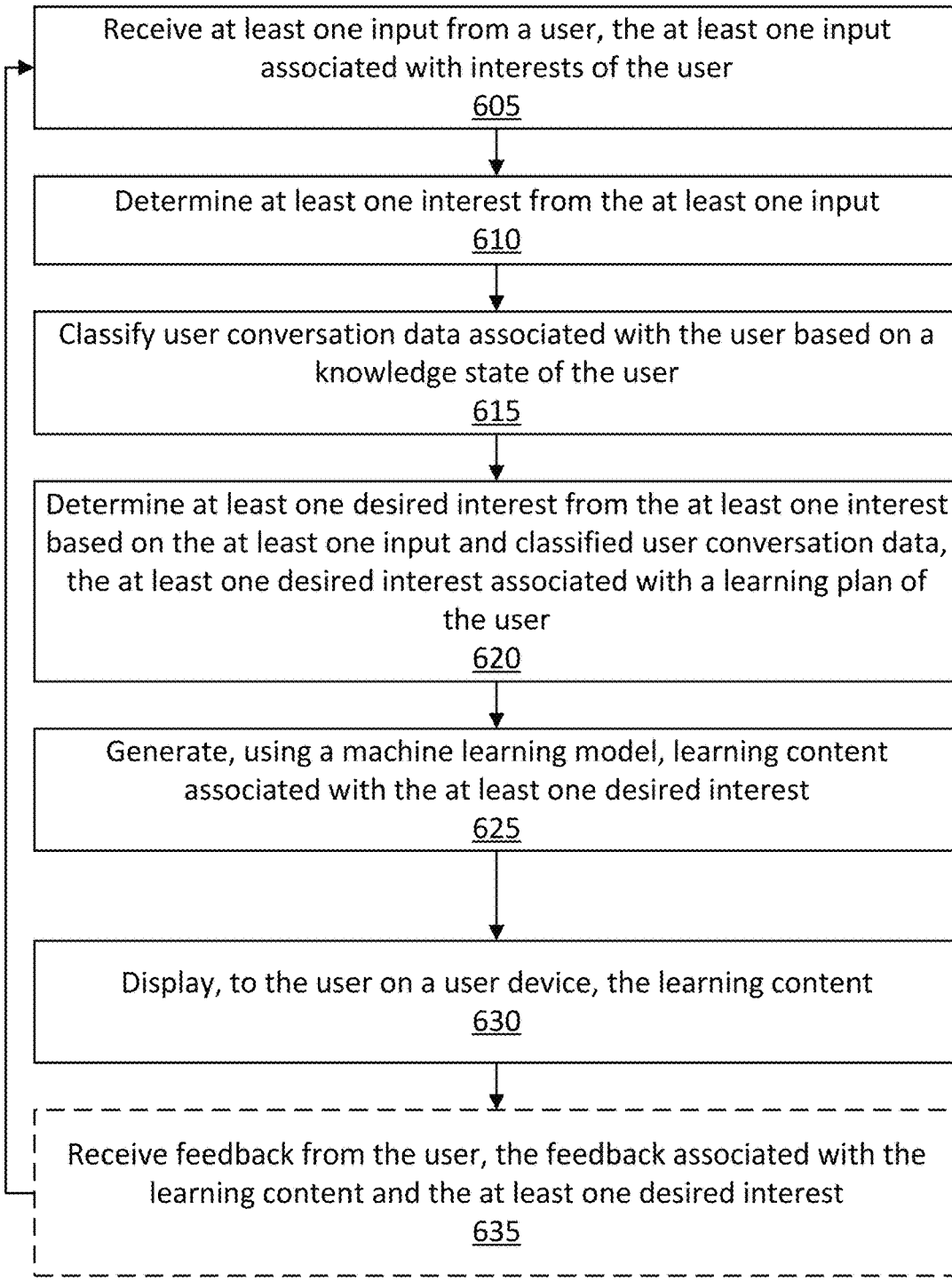
FIG. 6 shows a flowchart for a method for generating content for a user, according to another example embodiment.

FIG. 6 shows a flowchart for a method 600 for generating content for a user, according to another example embodiment. The method 600 includes receiving at least one input from a user, the at least one input associated with interests of the user, at 605; determining at least one interest from the at least one input, at 610; classifying user conversation data associated with the user based on a knowledge state of the user, at 615; determining at least one desired interest from the at least one interest based on the at least one input classified user conversation data, the at least one desired interest associated with a learning plan of the user, at 620; generating, using a machine learning model, learning content associated with the at least one desired interest, at 625; displaying, to the user on a user device, the learning content, at 630; and, optionally, receiving feedback from the user, the feedback associated with the learning content and the at least one desired interest, at 635. In some implementations, the method 600 can be executed by a system, such as the system 10 of FIG. 1A (e.g., the processor 102 of user customization system 100) and/or the system 30 of FIG. 3 (e.g., the processor of user customization system 300).

At 605, the method 600 includes receiving at least one input from a user. The at least one input is associated with interests of the user. The at least one input can include, for example, input from a database of interests, student selected interests, student questions and answers, and/or student feedback. At 610, the method 600 includes determining at least one interest from the at least one input. The at least one input can be determined to be explicitly mentioned by the user or can be determined using a model, such as a machine learning model. In some implementations, determining at least one interest can include determining the frequency of topics in the at least one input. If the frequency of a topic is greater than a predetermined threshold, the topic can be determined to be an interest associated with the user.

At 615, the method 600 includes classifying user conversation data associated with the user based on a knowledge state of the user. The conversation data can include context associated with the conversation data. The conversation data can be classified based on the topic discussed, skill level, and/or the like. At 620, the method 600 includes determining at least one desired interest from the at least one interest based on the at least one input and classified user conversation data. The at least one desired interest is associated with a learning plan of the user. The learning plan of the user can be associated with a school, university, a degree program, and/or the like. The at least one desired interest is determined as an interest that may be used to aid in the user learning the concepts associated with the learning plan. For example, the at least one desired interest may include soccer when the concept associated with the learning plan include concepts such as physics.

At 625, the method 600 includes generating, using a machine learning model, learning content associated with the at least one desired interest. In some implementations, the machine learning model is a language model (e.g., a large language model (LLM)). The generated learning content can include learning content that uses the at least one desired interest to provide context to the content. The generated learning content can include interest-specific explanations, interest-specific questions to check user understanding, interest-specific analogies, interest-specific real-world examples, interest-specific Socratic-style questions, interest-specific feedback, interest-specific similar solved problems, interest-specific hints, and/or the like.

At 630, the method 600 includes displaying, to the user on a user device, the learning content. The user can review and interact with the learning content to learn the information presented. Because the learning content is customized for the user, it is more likely that the user will engage with the learning content and learn the information. At 635, the method 600 optionally includes receiving feedback from the user. The feedback is associated with the learning content and the at least one desired interest. The feedback can indicate user preference in regard to the learning content and/or the at least one desired interest. For example, if a user is not interested in the at least one desired interest, the user can provide feedback that indicates that the user is uninterested. The feedback can also include information that indicates if the at least one desired interest is not relevant to the learning plan. In some implementations, after receiving user feedback, the method 600 returns to 605 with the feedback included in the at last one input. In some embodiments, the feedback can be used to train at least one machine learning model, such as the machine learning model using at 625. Training can include updating the model based on if the feedback is positive (e.g., desirable for the user) or negative (e.g., undesirable for the user). For example, if the user indicates, in the feedback, that the output of the machine learning model aligns with the at least one desired interest, the machine learning can be trained that the previous output was desirable. Conversely, if the user indicates, in the feedback, that the output of the machine learning model does not align with the at least one desired interest, the machine learning model can be trained that the previous output was undesirable. In some embodiments, the feedback can include a desired output. In some embodiments, training the machine learning model can include determining a difference between the output of the machine learning model and the feedback and training the machine learning model based on the feedback.

Figure 7:
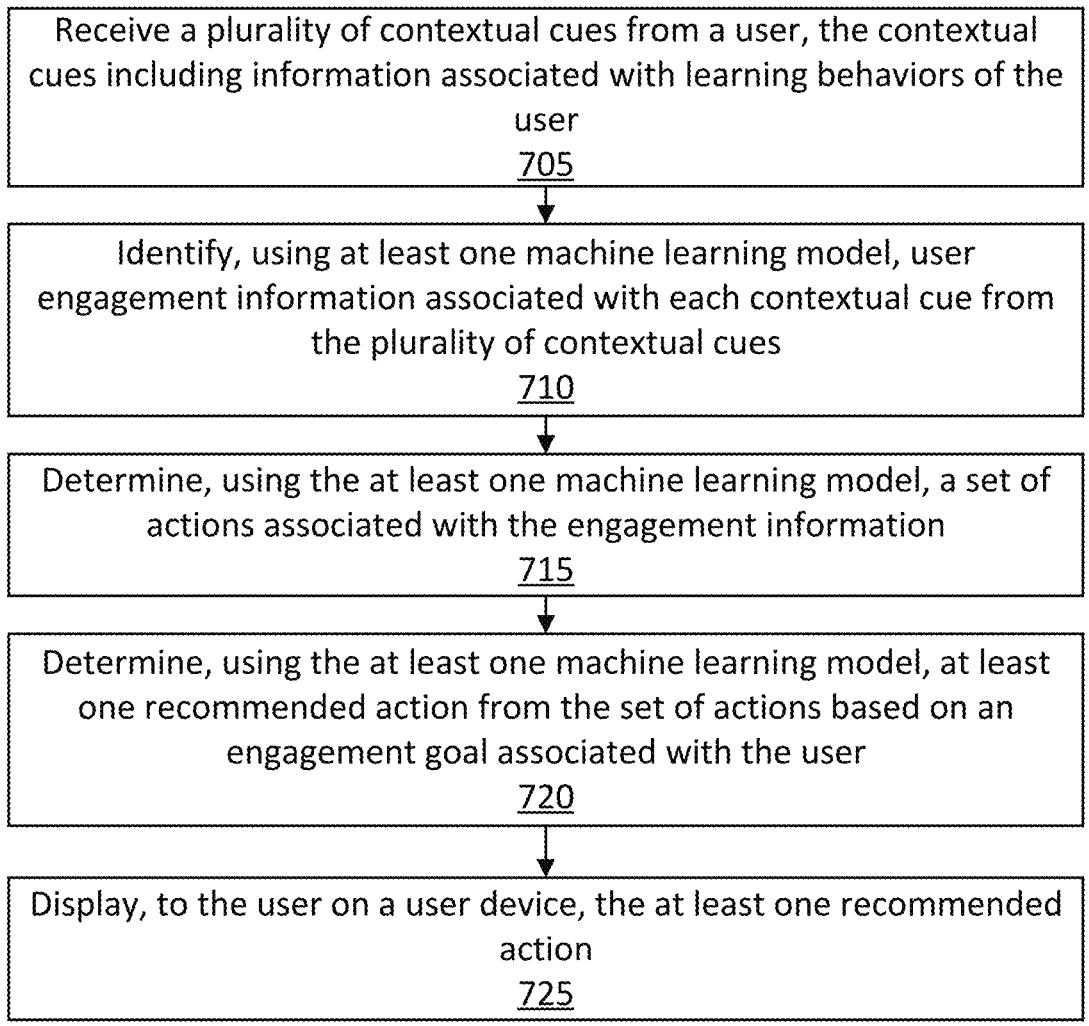
FIG. 7 shows a flowchart for a method for determining recommended actions for a user, according to an example embodiment.

FIG. 7 shows a flowchart for a method 700 for determining recommended actions for a user, according to an example embodiment. The method 700 includes receiving a plurality of contextual cues from a user, the contextual cues including information associated with learning behaviors of the user, at 705; identifying, using at least one machine learning model, user engagement information associated with each contextual cue from the plurality of contextual cues, at 710; determining, using the at least one machine learning model, a set of actions associated with the engagement information, at 715; determining, using the at least one machine learning model, at least one recommended action from the set of actions based on an engagement goal associated with the user, at 720; and displaying, to the user on a user device, the at least one recommended action, at 725. In some implementations, the method 700 can be executed by a system, such as the system 10 of FIG. 1A (e.g., the processor 102 of user customization system 100) and/or the system 40 of FIG. 4 (e.g., the processor of user customization system 400).

At 705, the method 700 includes receiving a plurality of contextual cues from a user. The contextual cues include information associated with learning behaviors of the user. In some implementations, the learning behaviors include engagement information of the user. In some implementations, the contextual cues include user conversation data with a conversation model, user uploaded quizzes and learning materials, user stated interests, a knowledge state of the user, implicit cues from user interactions, optimization policies (e.g., engagement goals, etc.), and/or the like. The contextual cues can be received from a database and/or from a user device.

At 710, the method 700 includes identifying, using at least one machine learning model, user engagement information associated with each contextual clue from the plurality of contextual cues. The engagement information indicates how the user engages with the learning content associated with each contextual cue. For example, the engagement information can indicate whether the user is focused on the learning content, how long the user focuses on the learning content, if the user takes a break while engaging with content, and/or the like.

At 715, the method 700 includes determining, using the at least one machine learning model, a set of actions associated with the engagement information. The set of actions can include actions that may increase user engagement. In some implementations, the set of actions can include actions identified that exceed a predetermined engagement threshold. For example, the engagement threshold can indicate that a user is likely to engage, at least at a desired level, with learning content associated with the set of actions. In some implementation, the set of actions can include suggested topics, suggested practice, suggested learning materials, challenge prompts, analogies, paraphrasing, pop quizzes, and/or the like.

At 720, the method 700 includes determining, using the at least one machine learning model, at least one recommended action from the set of actions based on an engagement goal associated with the user. In some implementations, the engagement goal is associated with an engagement duration, focus duration, problem solving speed, and/or the like. The at least one recommended action can be determined from the set of actions by determining which actions from the set of actions allow the user to achieve or make progress toward the engagement goal and selecting the action that is most likely to allow the user to achieve or make progress toward the engagement goal. At 725, the method 700 includes displaying, to the user on a user device, the at least one recommended action. The user can then choose to implement the at least one recommended action to increase engagement.

Referring generally to FIGS. 8-15, various user (e.g., the student S of FIGS. 1A-4) engagement (e.g., interaction) with a conversation model (e.g., structurally and/or functionally similar to the conversation model 160 of FIG. 1A, the conversation model 260 of FIG. 2, the conversation model 360 of FIG. 3, and/or the conversation model 460 of FIG. 4) displayed on a user device (e.g., functionally and/or structurally similar to the user device 130 of FIG. 1A, the student device 140 of FIG. 1A, the student device 240 of FIG. 2, the student device 240 of FIG. 2, the student device 340 of FIG. 3, and/or the student device 440 of FIG. 4) is shown. The outputs displayed in FIGS. 8-15 may be generated by a system such as the system 10 of FIG. 1A, the system 20 of FIG. 2, the system 30 of FIG. 4, and/or the system 40 of FIG. 4. The embodiments shown in FIGS. 8-15 are examples of potential outputs and, in some implementations, the outputs can be different than those shown in FIGS. 8-15. For example, if a different student interacts with the conversation model, the outputs may be different, as the system is configured to customize user experience based on the user.

The outputs shown in FIGS. 8-15 can be changed by the systems described herein, such as the system 100 of FIG. 1. For example, based on the inputs associated with a user, the outputs shown in FIGS. 8-15 can be altered. For example, altering can include customizing the outputs to a user, adjusting the output based on previous user experience, adjusting the output based on user preferences, and/or the like. In some embodiments, altering can include altering the layout of information such that the information can be communicated more effectively based on information associated with the user. In some embodiments, the outputs can be sent to a user device as a display signal.

Figure 8:
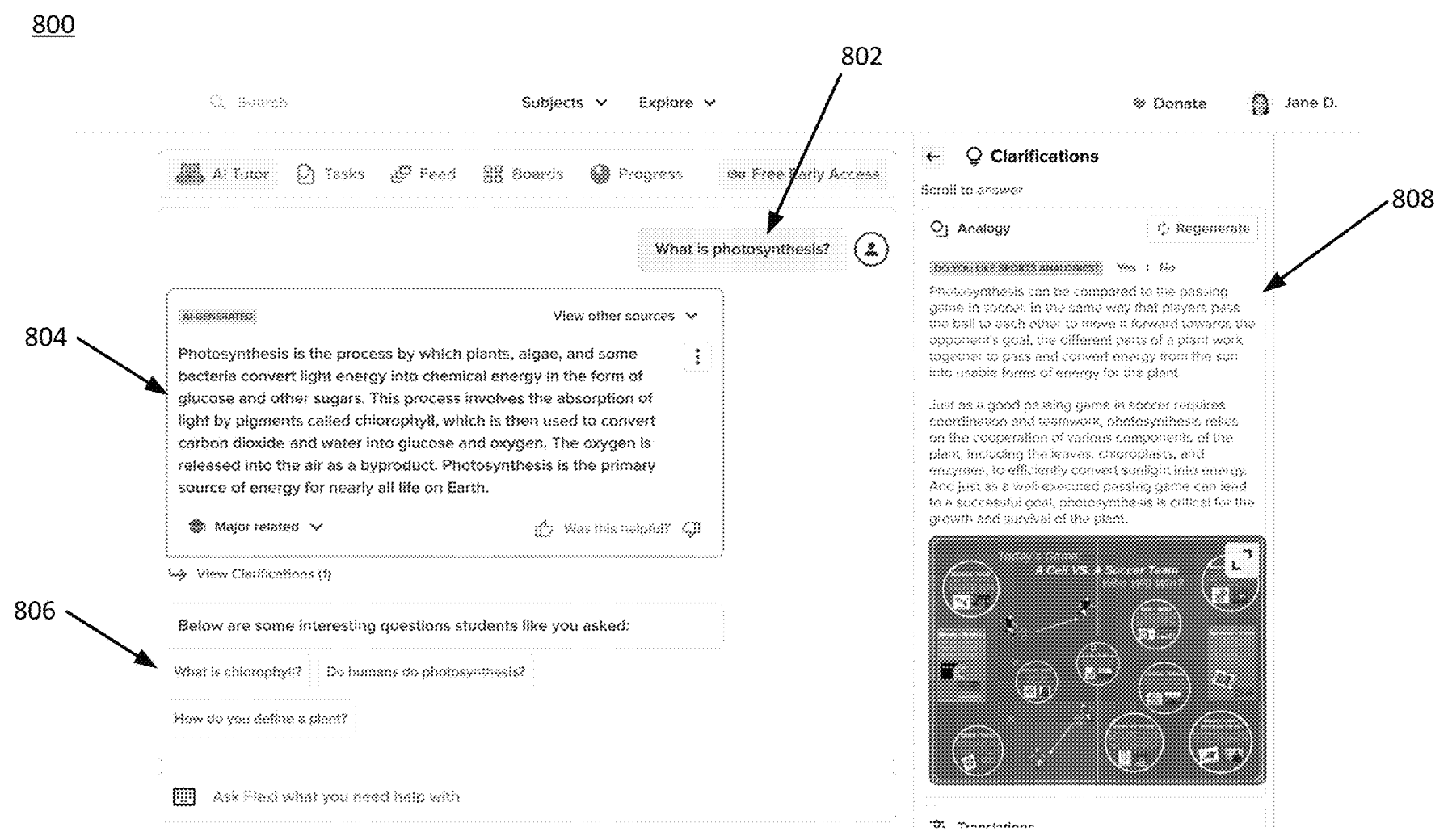

FIG. 8 is an example display (e.g., graphical user interface (GUI)) of a conversation environment 800. The conversation environment 800 may be displayed on a user device during an interaction with a conversation model. The conversation environment 800 depicts an interaction with the conversation model that is customized to the user based on user interest, goals, engagement, and/or the like. The conversation environment 800 includes a user question 802, a generated answer 804, related questions 806, and an analogy 808. The user question 802 is a question for the conversation model input by the student. In the example of FIG. 8, the user question 802 is "What is photosynthesis?" The generated answer 804 is an answer to the user question 802 generated by the conversation model. The generated answer 804 describes what photosynthesis is to the user and labels this answer as "AI-GENERATED", because the generated answer 804 is generated by an AI model (e.g., a large language model (LLM)). The generated answer 804 can include an indication of the relevance to the user (e.g., "Major related," "tangentially related," etc.), a request for user feedback, and an option to select a response from another/different source (e.g., textbook description, video, etc.).

The related questions 806 include generated questions that may be associated with similar questions other user have asked the conversation model. The related questions 806 are associated with the subject matter of the user question 802. For example, in FIG. 8, the related questions 806 include "What is chlorophyll?", "Do humans do photosynthesis?", and "How do you define a plant?" The analogy 808 is a generated explanation of the topic in the generated answer 804 explained using an interest of the user (e.g., identified as discussed herein). The analogy 808 is a soccer analogy of photosynthesis. The analogy 808 can include a prompt asking if the interest is relevant to the user. For example, as in FIG. 8, the prompt can ask "DO YOU LIKE SPORTS ANALOGIES?" The analogy 808 can include an option to "Regenerate" the analogy. If the user elects to regenerate the analogy, the user may be shown a different analogy 808 that is based on a different interest or a different approach using the same interest. In some implementations, the user is displayed the analogy based on an indication that further explanation is desired. For example, the user may select the generated answer 804 and select (or be presented with) the analogy 808 to further explain the concept associated with the generated answer 804.

Figure 9:
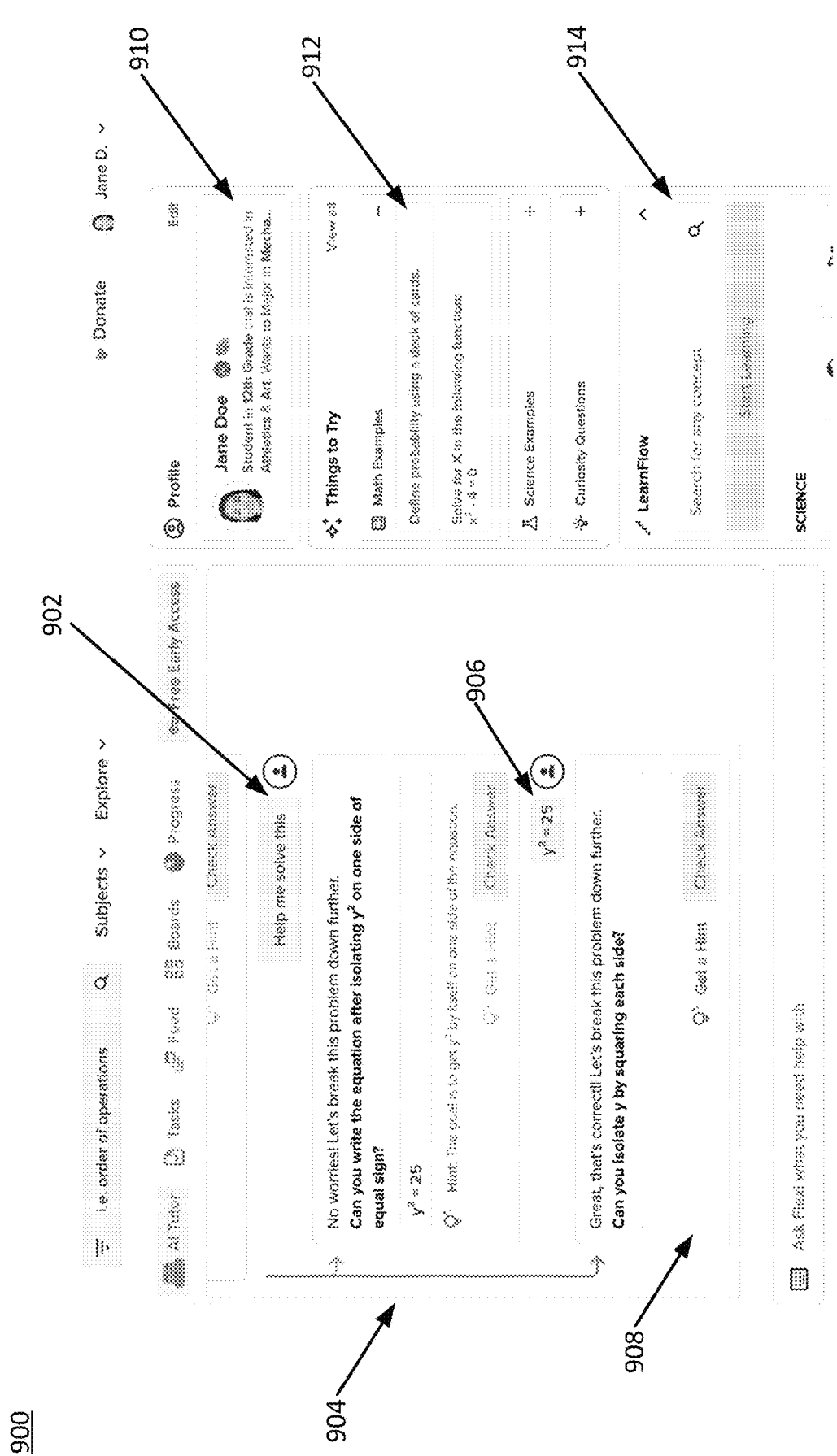

FIG. 9 is an example display (e.g., a GUI) of a conversation environment 900. The conversation environment 900 may be displayed on the user device during an interaction with a conversation model. The conversation environment 900 depicts an interaction with the conversation model that is customized to the user based on user interest, goals, engagement, and/or the like. The conversation environment 900 includes a user request 902, a first generated answer 904, a user answer 906, a second generated answer 908, user information 910, recommendations 912, and a search function 914.

The user request 902 is a request for help from the user to the conversation model. The user request 902 includes "Help me solve this." In this example, the user request 902 is related to a math concept. The first generated answer 904 includes a leading question generated by the conversation model. The first generated answer 904 includes a question that prompts the user to complete a first step towards solving a math problem. The user then inputs the user answer 906 in response to the first generated answer 904. The user answer 906 includes an answer to the question of the first generated answer 904. The conversation model then generates and displays the second generated answer 908. The second generated answer 908 includes a question that prompts the user to complete a second step towards solving the math problem. While not, shown, the process of conversation model prompts and user answers may repeat until the math problem is solved.

The user information 910 includes information associated with the user. For example, the user information includes a name of a user, a user status (e.g., student, etc.), a user age (e.g., grade level, age in years, etc.), user goals (e.g., college major), user interests, and/or the like. The user may review and/or change and/or augment the user information 910 to be accurate to the user. The recommendations 912 include recommendations of various types (e.g., question type, subjects, concepts, etc.) that a user can select to attempt or learn more. For example, the recommendations 912 include math examples, science examples, and curiosity questions. In some implementations, the recommendations 912 are associated with the user request 902. The search function 914 allows for the user to search for additional concepts to practice and/or learn.

Figure 10:
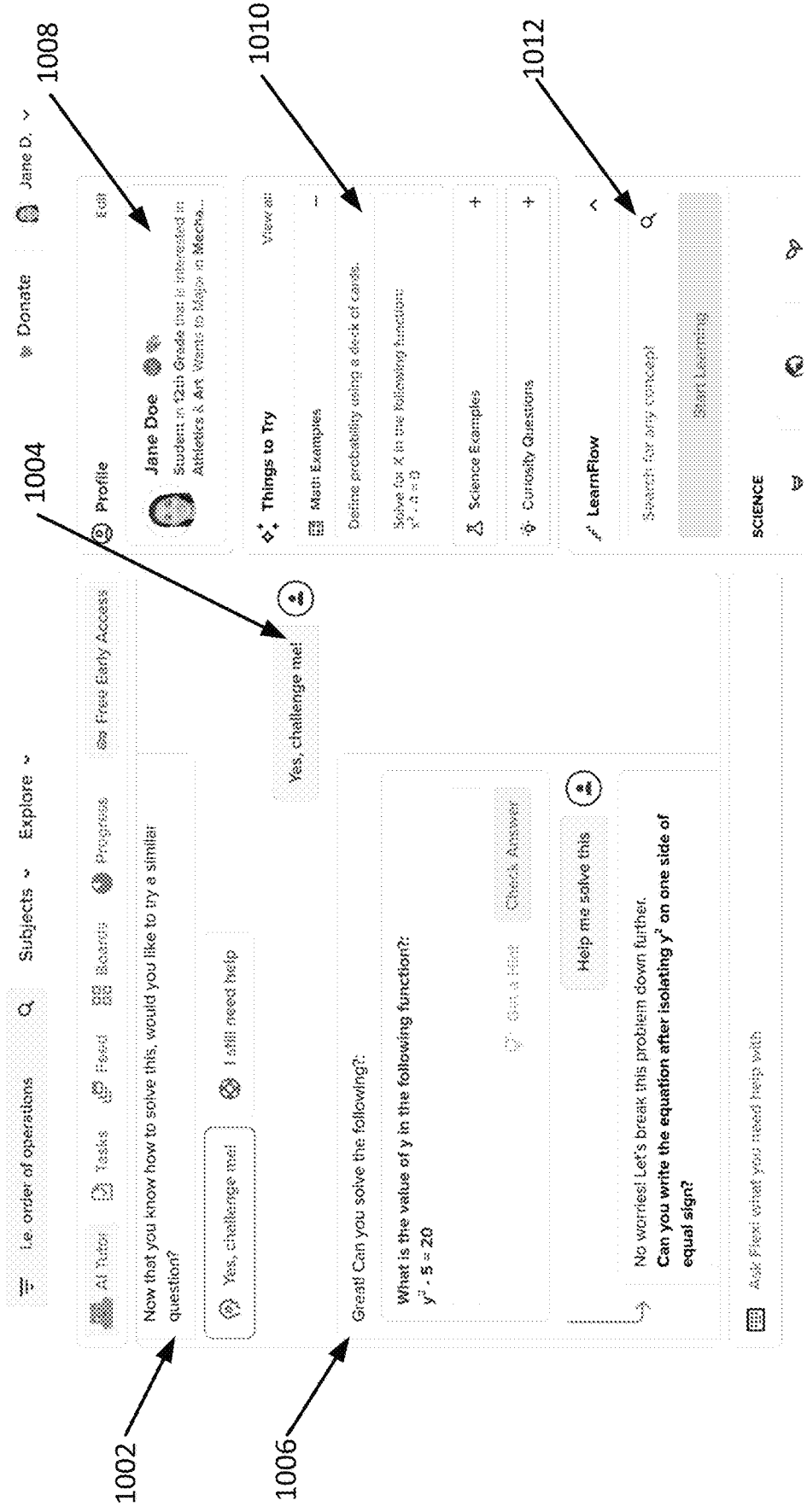

FIG. 10 is an example display (e.g., a GUI) of a conversation environment 1000. The conversation environment 1000 may be displayed on the user device during an interaction with the conversation model. The conversation environment 1000 depicts an interaction with the conversation model that is customized to the user based on user interest, goals, engagement, and/or the like. The conversation environment 1000 includes a generated prompt 1002, a user answer 1004, an interaction 1006, user information 1008 (e.g., functionally and/or structurally similar to the user information 910 of FIG. 9), recommendations 1010 (e.g., functionally and/or structurally similar to the recommendations 912 of FIG. 9), and a search function 1012 (e.g., functionally and/or structurally similar to the search function 914 of FIG. 9).

The generated prompt 1002 includes a prompt to the user that asks if the user desires to solve a question similar to a previously solved question. The user answer 1004 indicates that the user desires a similar question. The interaction 1006 includes an interaction between the conversation model and the user discussing a similar question.

Figure 11:
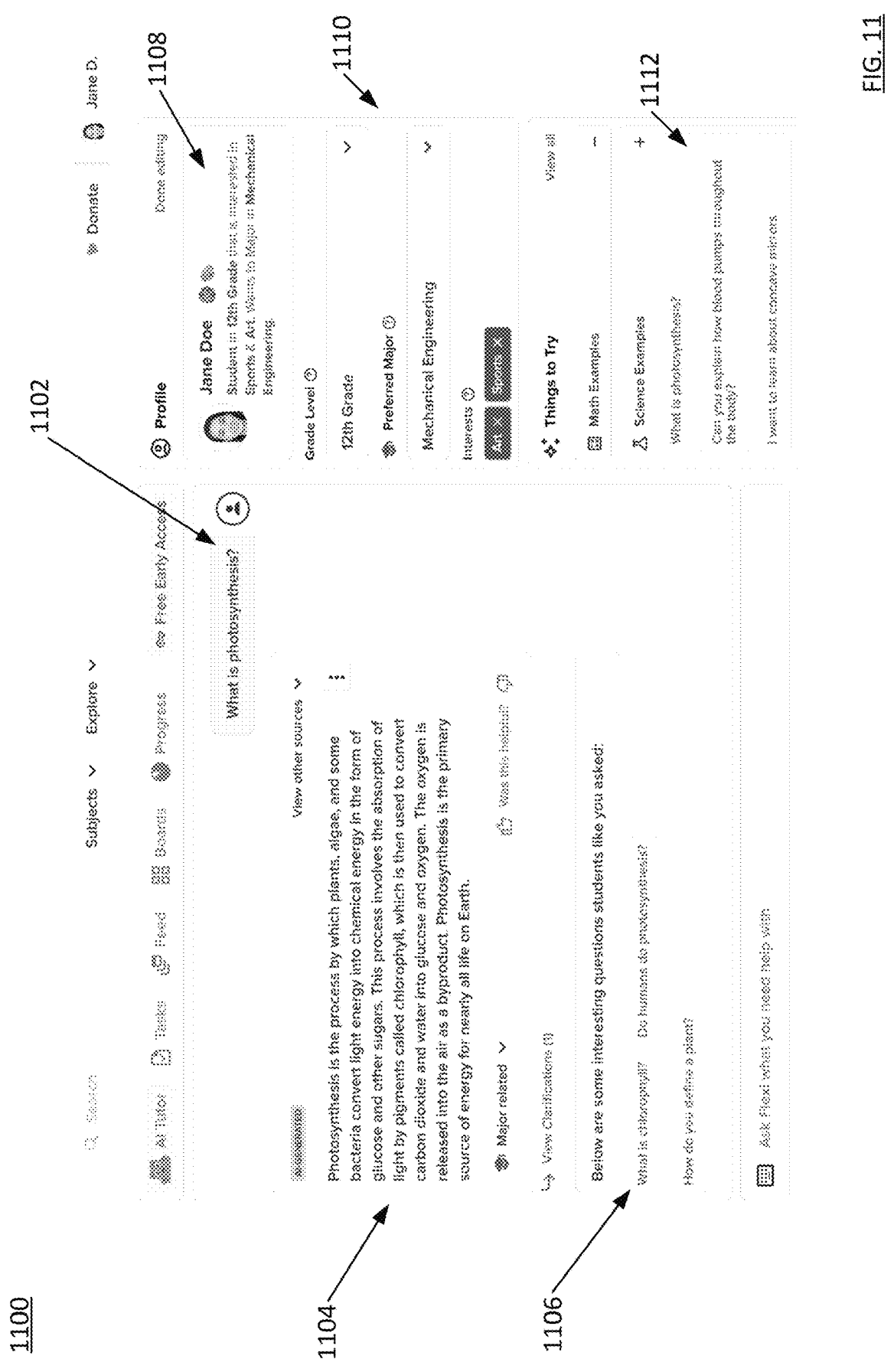

FIG. 11 is an example display (e.g., a GUI) of a conversation environment 1100. The conversation environment 1100 may be displayed on the user device during an interaction with the conversation model. The conversation environment 1100 depicts an interaction with the conversation model that is customized to the user based on user interest, goals, engagement, and/or the like. The conversation environment 1100 includes a user question 1102 (e.g., functionally and/or structurally similar to the user question 802 of FIG. 8), a generated answer 1104 (e.g., functionally and/or structurally similar to the generated answer 804 of FIG. 8), related questions 1106 (e.g., functionally and/or structurally similar to the related questions 806 of FIG. 8), user information (e.g., functionally and/or structurally similar to the user information 910 of FIG. 9 and/or the user information 1008 of FIG. 10), user information choices 1110, and recommendations 1112 (e.g., functionally and/or structurally similar to the recommendations 912 of FIG. 9 and/or the recommendations 1010 of FIG. 10).

The user information 1108 can be augmented or changed by the user interacting with the user information choices 1110. The user information choices 1110 include an option to change the grade level associated with the user, to change the preferred major associated with the user, and/or to augment and/or update the interests associated with the user. In some implementations, the user information choices 1110 can include options to change other information associated with the user. As seen in FIG. 11, the recommendations 1112 are associated with the user question 1102.

Figure 12:
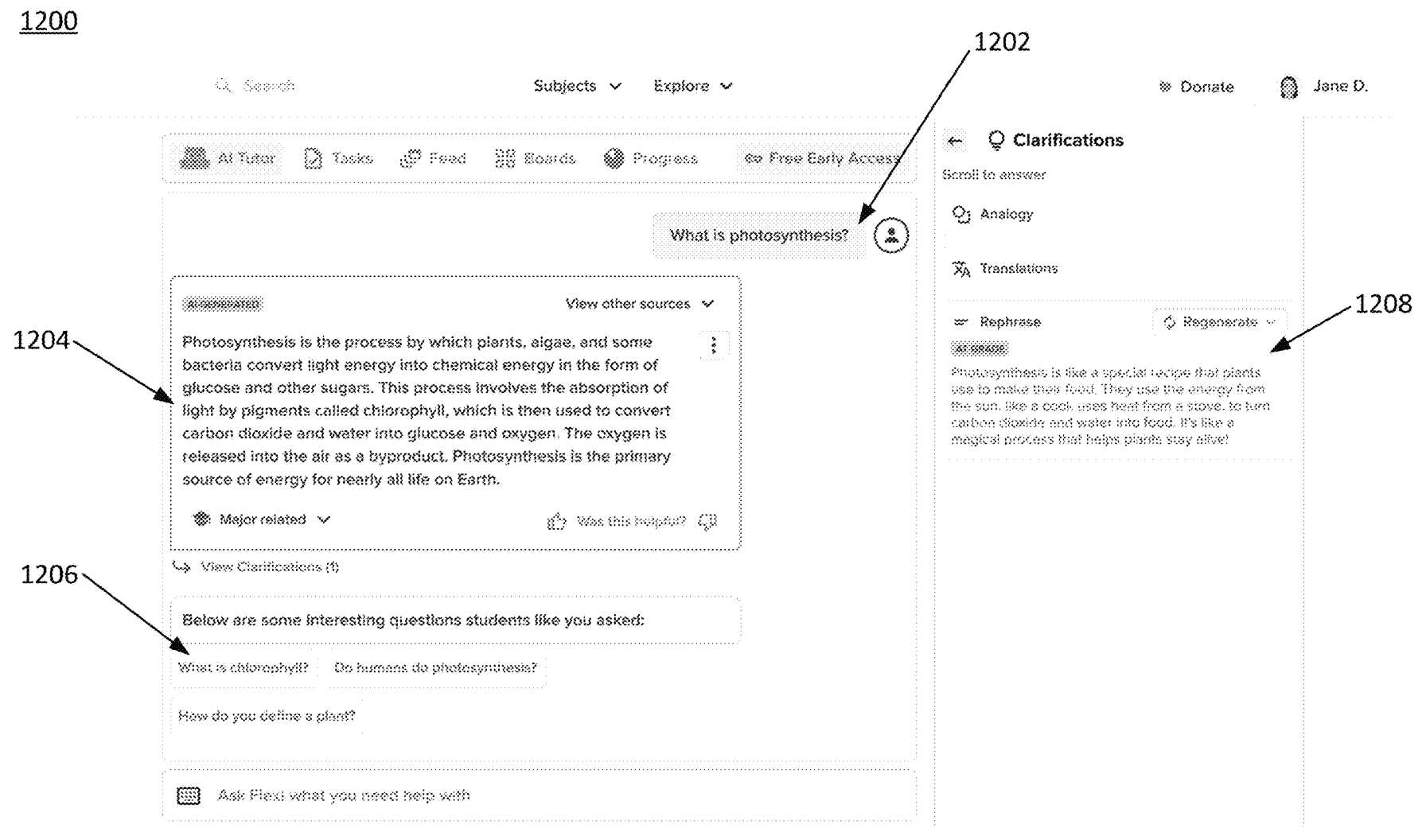

FIG. 12 is an example display (e.g., a GUI) of a conversation environment 1200. The conversation environment 1200 may be displayed on the user device during an interaction with the conversation model. The conversation environment 1200 depicts an interaction with the conversation model that is customized to the user based on user interest, goals, engagement, and/or the like. The conversation environment 1200 includes a user question 1202 (e.g., functionally and/or structurally similar to the user question 802 of FIG. 8 and/or the user questions 1102 of FIG. 11), a generated answer 1204 (e.g., functionally and/or structurally similar to the generated answer 804 of FIG. 8 and/or the generated answer 1104 of FIG. 11), related questions 1206 (e.g., functionally and/or structurally similar to the related questions 806 of FIG. 8 and/or the related questions of FIG. 11), and a rephrasing 1208.

The rephrasing 1208 includes a rephrasing of the generated answer 1204. The rephrasing 1208 is a rephrasing of the generated answer 1204 based on the grade level of the user. In some implementations, the rephrasing 1208 can be generated based on other information associated with the user. For example, the rephrasing 1208 can be generated based on a knowledge state of the user, user interest, user goal, user location, and/or the like. The rephrasing 1208 can be generated to aid a user in better understanding the generated answer 1104 (e.g., when the user does not fully understand the generated answer 1104).

Figure 13:
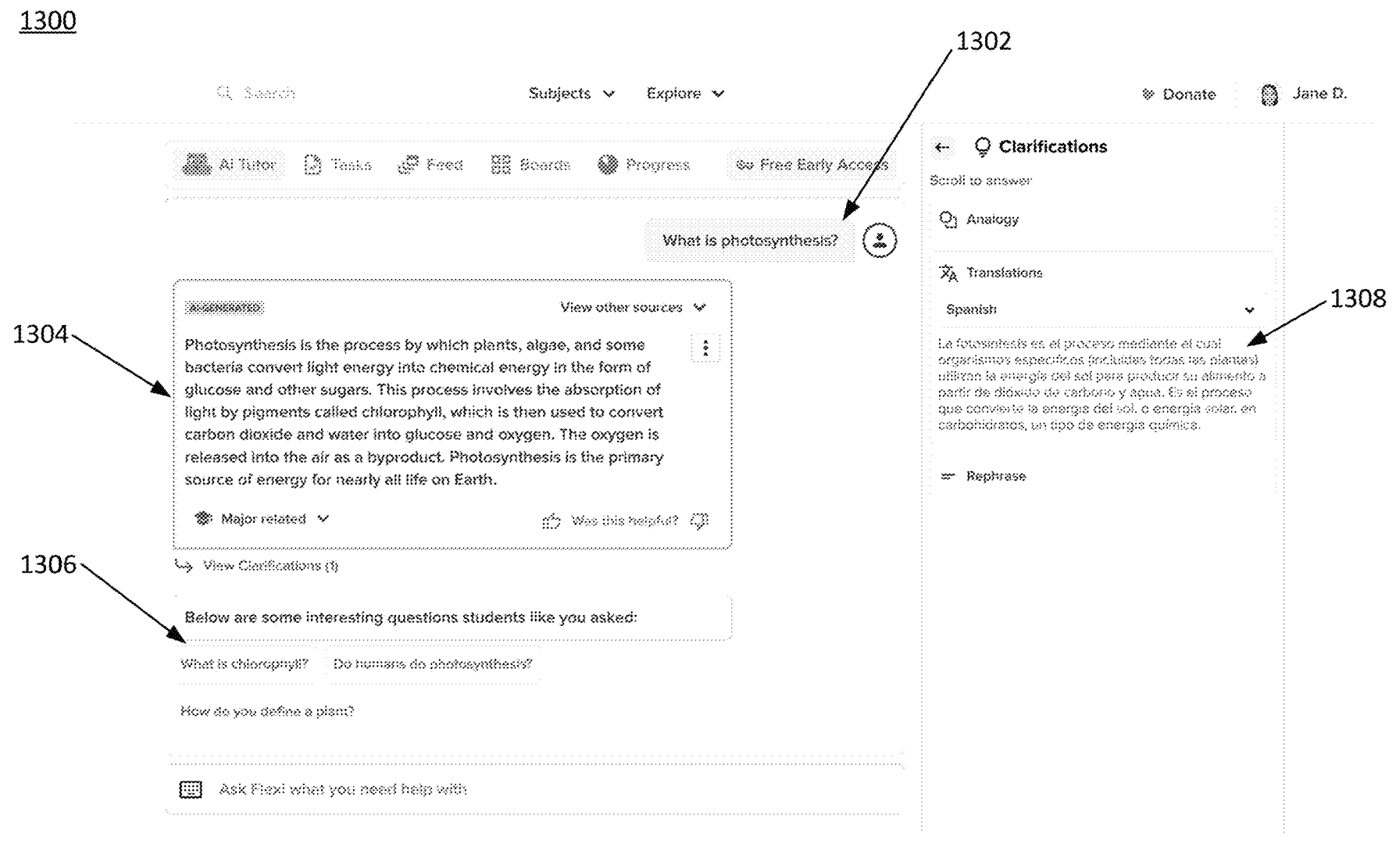

FIG. 13 is an example display (e.g., a GUI) of a conversation environment 1300. The conversation environment 1300 may be displayed on the user device during an interaction with the conversation model. The conversation environment 1300 depicts an interaction with the conversation model that is customized to the user based on user interest, goals, engagement, and/or the like. The conversation environment 1300 includes a user question 1302 (e.g., functionally and/or structurally similar to the user question 802 of FIG. 8 and/or the user question 1102 of FIG. 11 and/or the user question 1202 of FIG. 12), a generated answer 1304 (e.g., functionally and/or structurally similar to the generated answer 804 of FIG. 8, the generated answer 1104 of FIG. 11 and/or the generated answer 1204 of FIG. 12), related questions 1306 (e.g., functionally and/or structurally similar to the related questions 806 of FIG. 8, the related questions of FIG. 11 and/or the related questions 1206 of FIG. 12), and a translation 1308.

The translation 1308 includes a translation of the generated answer 1304. The translation 1308 is a translation of the generated answer 1304 based on a language associated with the user. For example, if the user is bilingual, an additional language may be associated with the user. In some implementations, the translation 1308 can be generated based on other information associated with the user. For example, the translation 1308 can be generated based on the location of a user.

Figure 14:
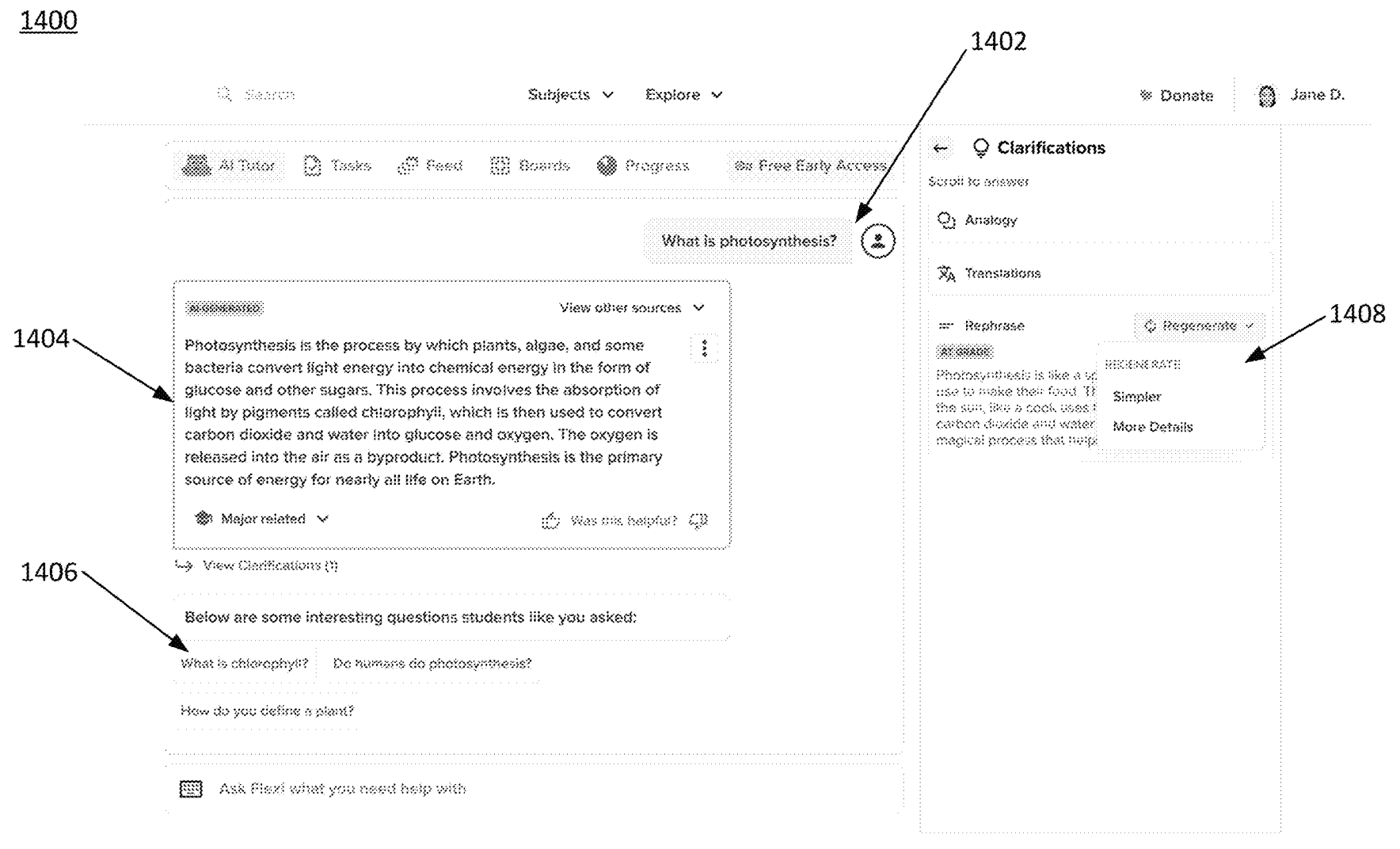

FIG. 14 is an example display (e.g., a GUI) of a conversation environment 1400. The conversation environment 1400 may be displayed on the user device during an interaction with the conversation model. The conversation environment 1400 depicts an interaction with the conversation model that is customized to the user based on user interest, goals, engagement, and/or the like. The conversation environment 1400 includes a user question 1402 (e.g., functionally and/or structurally similar to the user question 802 of FIG. 8 and/or the user questions 1102 of FIG. 11), a generated answer 1404 (e.g., functionally and/or structurally similar to the generated answer 804 of FIG. 8 and/or the generated answer 1104 of FIG. 11), related questions 1406 (e.g., functionally and/or structurally similar to the related questions 806 of FIG. 8 and/or the related questions of FIG. 11), and an optioned rephrasing 1408.

The optioned rephrasing 1208 includes a rephrasing of the generated answer 1204 as well as an option to simplify the rephrasing and/or include additional information. This allows the user to augment the rephrasing based on a knowledge state of the user. In some implementations, the user decision and/or preference of the options can be saved so that future rephrasing is generated based on the knowledge state of the user.

Figure 15:
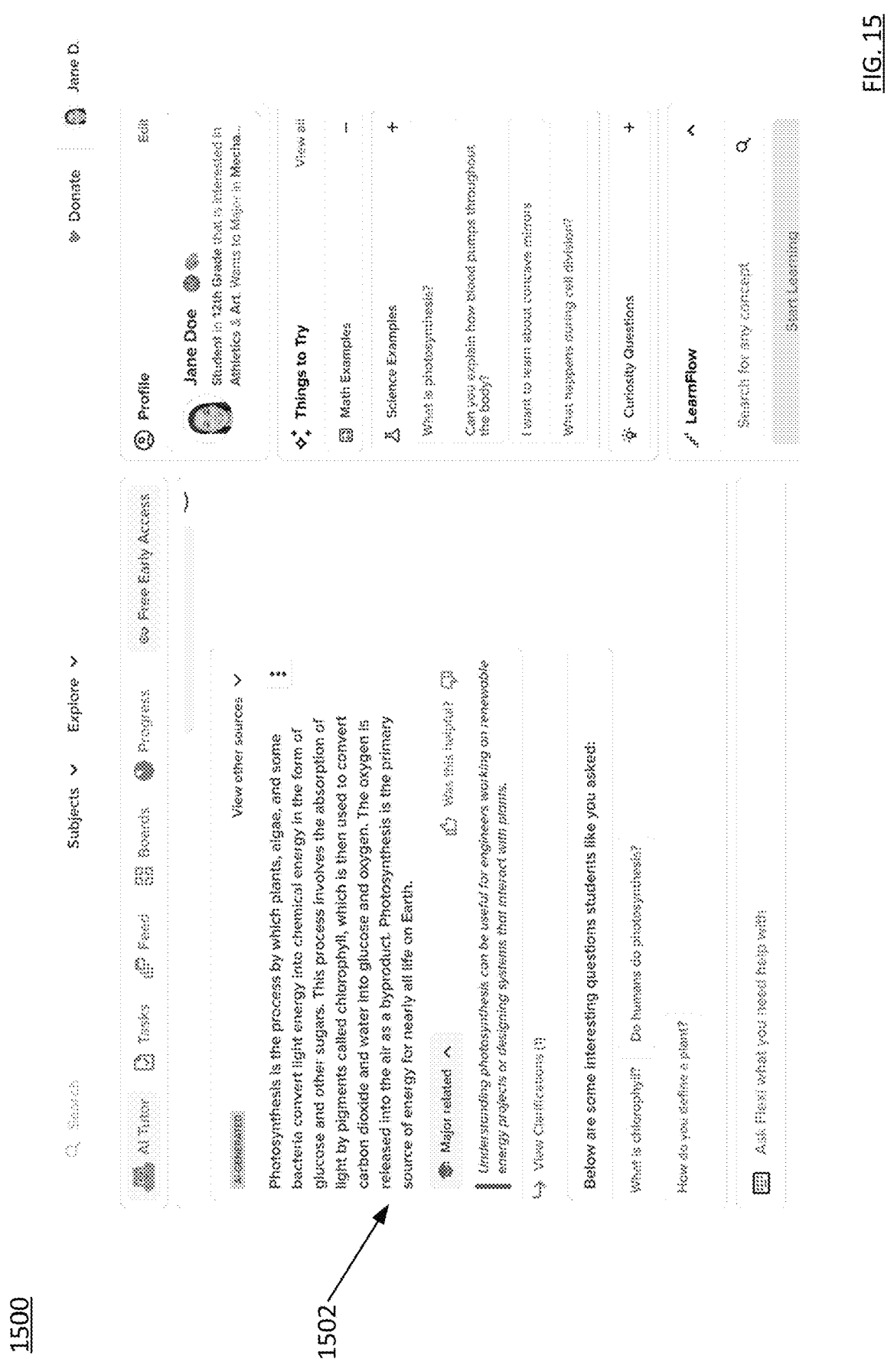

FIG. 15 is an example display (e.g., a GUI) of a conversation environment 1500. The conversation environment 1500 may be displayed on the user device during an interaction with the conversation model. The conversation environment 1500 depicts an interaction with the conversation model that is customized to the user based on user interest, goals, engagement, and/or the like. The conversation environment 1500 includes a generated answer 1502. The generated answer 1502 includes a generated description of photosynthesis as well as additional information related to the goal of the user (e.g., how it is related to a major of the user). The additional information includes a generated description of how the content associated with the generated answer is relevant to the goal of the user. For example, the additional information described how photosynthesis is related to being an engineer.

While shown and described herein as being used to determine and evaluate a student's goals or interests and/or evaluate a student's engagement in an educational setting and/or context and to customize a student's experience, in other implementations, the systems and methods described herein can be used for any other suitable purpose. For example, the predictive systems and methods described herein can be used to customize an experience of an individual in a particular role and/or job, increase productivity of a company, increase productivity of a system for a particular task, and/or the like. The systems and methods described herein can also be used to assess and increase engagement in other settings or contexts such as on the internet, in the workplace, etc.

In some embodiments, a method includes receiving, by a compute device, at least one input from at least one of a user device of a user or at least one database. The method further includes detecting, by the compute device, at least one parameter from the at least one input, the at least one parameter associated with a context. The method further includes generating, by a first machine learning model and based on the at least one parameter, a first set of data classes, the first set of data classes enriched with the context. The method further includes determining, by the compute device, if each data class from the first set of data classes is associated with a data class repository to define a subset of data classes, the subset of data classes including data classes that are not associated with a data class repository. The method further includes generating, by a second machine learning model, at least one data class repository for each data class from the subset of data classes. The method further includes generating a display signal to display, on the user device, information associated with at least one data class repository associated with the first set of data classes, the display signal associated with a graphical user interface. The method further includes altering, using a third machine learning model based on the context, the display signal, wherein altering the display signal includes altering at least one portion of the graphical user interface associated with the context. The method further includes sending the display signal to display the at least one portion of the graphical user interface on the user device.

In some implementations the at least one parameter includes at least one of a goal associated with the user or an interest of the user.

In some implementations, the data classes include learning content.

In some implementations, the method further includes determining, using a reinforcement learning model, a set of actions associated with the at least one parameter, determining, using the reinforcement learning model, at least one recommended action from the set of actions based on a user parameter associated with the user, and executing the at least one recommended action.

In some implementations, the at least one parameter is associated with user engagement.

In some implementations, the context is associated with learning behaviors associated with the user.

In some implementations, the at least one input includes user interactions with a conversation model.

In some implementations, the method further includes removing, from the first set of data classes, data classes associated with a set of learned data classes of the user.

In some embodiments, the method includes receiving, by a compute device, at least one input from at least one of a user device of a user or at least one database. The method further includes detecting, by the compute device, at least one parameter from the at least one input, the at least one parameter associated with a context. The method includes classifying, by a classifier based on historical user data, current user information associated with the user. The method includes determining, based on the classified current user information, at least one desired parameter from the at least one parameter. The method includes generating, by at least one machine learning model based on the at least one desired parameter, at least one content repository, the at least one content repository enriched with the context. The method includes generating, using a reinforcement learning model, a random set of content enrichment data. The method includes selecting, using a reinforcement learning model based on a user parameter, at least one content enrichment from data set of content enrichment data, the reinforcement learning model trained based on content enrichment and the at least one desired parameter. The method includes enriching the at least one content repository with the at least one content enrichment. The method includes sending a signal to display, on the user device, information associated with the at least one content repository.

In some implementations, the at least one parameter includes a user interest associated with the user.

In some implementations, the historical user data can include a knowledge state of the user.

In some implementations, the at least one content repository includes learning content.

In some embodiments, a non-transitory processor-readable medium stores code representing instructions to be executed by one or more processors. The instructions include code to cause the one or more processors to receive, a plurality of inputs associated with interaction data of a user. The instructions include code to cause the one or more processor to generate, using at least one machine learning model based on at least the plurality of inputs, a set of data. The instructions include code to case the one or more processors to determine, using the at least one machine learning model based on the interaction data, at least one parameter. The instructions include code to cause the one or more processors to update, based on the at least one parameter and at least one target parameter, the set of data. The instructions include code to cause the one or more processors to display, on a user device, the set of data. The instructions include code to cause the one or more processors to receive a plurality of responses associated with the user and the set of data. The instructions include code to cause the one or more processors to generate, using at least one machine learning model based on the plurality of responses, at least one updated parameter. The instructions include code to cause the one or more processors to train, the at least one machine learning model based on a difference between the at least one updated parameter and the target parameter.

In some implementations, when the interaction data includes user goals, the code to cause the one or more processors to generate the set of data includes code to cause the one or more processors to generate, using a first machine learning model from the at least one machine learning model, a set of data class candidates based on the user goals, determine if each data class from the set of data class candidates is associated with the set of data to define a subset of data class candidates, and generate, using a second machine learning model from the at least one machine learning model, a second set of data for each data class from the subset of data class candidates.

In some implementations, the code to cause the one or more processors to generate the set of data includes code to cause the one or more processors to identify a set of unlearned data classes from the set of data class candidates that are not associated with a set of learned data classes of the user.

In some implementations, the code to cause the one or more processors to generate the set of data includes code to cause the one or more processors to revise the set of data class candidates based on an input from a reviewing user.

In some implementations, the code to cause the one or more processors to generate the set of data includes code to cause the one or more processors to revise each data class from the set of data class candidates based on an input from a reviewing user.

In some implementations, when the interaction data includes user interests, the code to cause the one or more processors to generate the set of data includes code to cause the one or more processors to determine at least one interest from the plurality of inputs, classify user conversation data based on a knowledge state of the user, determine at least one desired interest from the at least one interest, and generate, using the at least one machine learning model, the set of data associated with the at least one desired interest.

In some implementations, the at least one machine learning model is a large language model.

In some implementations, when the interaction data includes user behavior, the instructions further comprise code to cause the one or more processors to identify, using the at least one machine learning model, engagement information associated with contextual cues in the plurality of inputs, determine, using the at least one machine learning model, a set of actions associated with the engagement information, determine, using the at least one machine learning model, at least one recommended action from the set of actions based on an engagement goal associated with the user, and display, on the user device, the at least one recommended action.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including,"

"carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
receiving, by a compute device, at least one input from at least one of a user device of a user or at least one database;
detecting, by the compute device, at least one parameter from the at least one input, the at least one parameter associated with a context;
generating, by a first machine learning model and based on the at least one parameter, a first set of data classes, the first set of data classes enriched with the context;
determining, by the compute device, if each data class from the first set of data classes is associated with a data class repository to define a subset of data classes, the subset of data classes including data classes that are not associated with a data class repository;
generating, by a second machine learning model, at least one data class repository for each data class from the subset of data classes;
generating a display signal to display, on the user device, information associated with at least one data class repository associated with the first set of data classes, the display signal associated with a graphical user interface;
altering, using a third machine learning model based on the context, the display signal, wherein altering the display signal includes altering at least one portion of the graphical user interface associated with the context; and
sending the display signal to display the at least one portion of the graphical user interface on the user device.

2. The method of claim 1, wherein the at least one parameter includes at least one of a goal associated with the user or an interest of the user.

3. The method of claim 1, wherein the data classes include learning content.

4. The method of claim 1, further comprising:
determining, using a reinforcement learning model, a set of actions associated with the at least one parameter;
determining, using the reinforcement learning model, at least one recommended action from the set of actions based on a user parameter associated with the user; and
executing the at least one recommended action.

5. The method of claim 1, wherein the at least one parameter is associated with user engagement.

6. The method of claim 1, wherein the context is associated with learning behaviors associated with the user.

7. The method of claim 1, wherein the at least one input includes user interactions with a conversation model.

8. The method of claim 1, further comprising:
removing, from the first set of data classes, data classes associated with a set of learned data classes of the user.

9. A non-transitory processor-readable medium storing code representing instructions to be executed by one or more processors, the instructions comprising code to cause the one or more processors to:
receive, by a compute device, at least one input from at least one of a user device of a user or at least one database;
detect, by the compute device, at least one parameter from the at least one input;
generate, by a first machine learning model and based on the at least one parameter, a first set of data classes;
determine, by the compute device, if each data class from the first set of data classes is associated with a data class repository to define a subset of data classes, the subset of data classes including data classes that are not associated with a data class repository;
generate, by a second machine learning model, at least one data class repository for each data class from the subset of data classes;

enrich the at least one data class repository with at least one content enrichment, the at least one content enrichment associated with the at least one parameter and a context;

generate a display signal to display, on the user device, information associated with at least one data class repository associated with the first set of data classes, the display signal associated with a graphical user interface;

alter, using a third machine learning model based on the context, the display signal, wherein altering the display signal includes altering at least one portion of the graphical user interface associated with the context; and send the display signal to display the at least one portion of the graphical user interface on the user device.

10. The non-transitory processor-readable medium of claim 9, wherein the at least one parameter includes at least one of a goal associated with the user or an interest of the user.

11. The non-transitory processor-readable medium of claim 9, wherein the first set of data classes includes learning content.

12. The non-transitory processor-readable medium of claim 9, wherein the at least one parameter is associated with user engagement.

13. The non-transitory processor-readable medium of claim 9, wherein the at least one input includes user interactions with a conversational model.

14. A method, comprising:

receiving, by a compute device, at least one input from at least one of a user device of a user or at least one database;

detecting, by the compute device, at least one parameter from the at least one input, the at least one parameter associated with a context;

classifying, by a classifier based on historical user data, current user information associated with the user to produce classified user information;

determining, based on the classified user information, at least one desired parameter from the at least one parameter;

generating, by a first machine learning model and based on the at least one desired parameter, a first set of data classes, the first set of data classes enriched with the context;

generating, by a second machine learning model, at least one data class repository for each data class from a subset of data classes from the first set of data classes, the subset of data classes associated with a plurality of data class repositories;

generating a display signal to display, on the user device, information associated with at least one data class repository associated with the first set of data classes, the display signal associated with a graphical user interface;

altering, using a third machine learning model based on the context, the display signal, wherein altering the display signal includes altering at least one portion of the graphical user interface associated with the context; and sending the display signal to display the at least one portion of the graphical user interface on the user device.

15. The method of claim 14, further comprising:

determining, by the compute device, if each data class from the first set of data classes is associated with a data class repository from the plurality of data class repositories to define the subset of data classes, the subset of data classes including data classes that are not associated with a data class repository.

16. The method of claim 14, wherein the at least one parameter includes at least one of a goal associated with the user or an interest of the user.

17. The method of claim 14, wherein the first set of data classes includes learning content.

18. The method of claim 14, wherein the at least one parameter is associated with user engagement.

19. The method of claim 14, wherein the context is associated with learning behaviors associated with the user.

20. The method of claim 14, wherein the at least one input includes user interactions with a conversational model.

* * * * *